(12) United States Patent
Mishra et al.

(10) Patent No.: US 11,287,989 B2
(45) Date of Patent: Mar. 29, 2022

(54) DYNAMIC ALLOCATION OF SUB BLOCKS

(71) Applicant: Western Digital Technologies, Inc., San Jose, CA (US)

(72) Inventors: Shivam Mishra, Bangaluru (IN); Hitesh Golechchha, Bangalore (IN); Shakti Bhatnagar, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/828,532

(22) Filed: Mar. 24, 2020

(65) Prior Publication Data
US 2021/0303185 A1  Sep. 30, 2021

(51) Int. Cl.
*G06F 3/06* (2006.01)

(52) U.S. Cl.
CPC .......... *G06F 3/0631* (2013.01); *G06F 3/0604* (2013.01); *G06F 3/064* (2013.01); *G06F 3/0652* (2013.01); *G06F 3/0659* (2013.01); *G06F 3/0679* (2013.01)

(58) Field of Classification Search
CPC .... G06F 3/0631; G06F 3/0604; G06F 3/0659; G06F 3/064; G06F 3/0679; G06F 3/0652
See application file for complete search history.

(56) References Cited

U.S. PATENT DOCUMENTS

| | | | |
|---|---|---|---|
| 8,239,643 B2 | 8/2012 | Gorobets et al. | |
| 8,316,177 B2 | 11/2012 | Conley | |
| 8,677,058 B2 | 3/2014 | Jung et al. | |
| 9,053,808 B2 | 6/2015 | Sprouse et al. | |
| 9,312,026 B2 | 4/2016 | Kochar et al. | |
| 9,582,208 B2 | 2/2017 | Han et al. | |
| 9,652,381 B2 | 5/2017 | Higgins et al. | |
| 9,715,444 B2 | 7/2017 | Lee et al. | |
| 9,734,911 B2 | 8/2017 | Sinclair et al. | |
| 10,002,073 B2 | 6/2018 | Cai et al. | |
| 10,101,942 B1* | 10/2018 | Parker | G06F 12/0246 |
| 10,157,680 B2 | 12/2018 | Yang et al. | |
| 11,024,390 B1* | 6/2021 | Aster | G11C 16/10 |
| 2008/0091871 A1* | 4/2008 | Bennett | G06F 12/0246 711/103 |
| 2011/0093680 A1* | 4/2011 | Lordello | G06F 12/0292 711/173 |
| 2014/0297921 A1 | 10/2014 | Chang | |

(Continued)

FOREIGN PATENT DOCUMENTS

CN          107273303 A    10/2017

*Primary Examiner* — Masud K Khan
*Assistant Examiner* — Trung-Hao Joseph Nguyen
(74) *Attorney, Agent, or Firm* — Patterson & Sheridan, LLP; Steven H. Versteeg

(57) ABSTRACT

A system, apparatus, and method for dynamic allocation of sub-blocks. First, a non-volatile memory array receives a set of write commands. The non-volatile memory array comprises multiple memory dies organized into metablocks. The metablocks are configured to span two or more memory dies. A stream manager determines a workload type for the set of write commands. A block allocation manager selects a target storage block to receive the set of write commands based on the workload type. The selected target storage block is configured to receive data blocks for the workload type and the block allocation manager directs the set of write commands to the target storage block.

20 Claims, 11 Drawing Sheets

(56) References Cited

U.S. PATENT DOCUMENTS

| | | |
|---|---|---|
| 2016/0267004 A1 | 9/2016 | Perlstein et al. |
| 2017/0139839 A1* | 5/2017 | Ke ......................... G06F 3/0679 |
| 2018/0188956 A1* | 7/2018 | Cr ......................... G06F 3/0653 |
| 2019/0348129 A1* | 11/2019 | Chin .................. G11C 16/0483 |
| 2021/0064290 A1* | 3/2021 | Kanno .................. G06F 3/0656 |

* cited by examiner

|     | Block Mode | Block Availability | ... | Write Temp | PE count |
| --- | --- | --- | --- | --- | --- |
| MB0 | 1 | 0 | ... | 20 | 1000 |
| MB1 | 1 | 0 | ... | 20 | 1000 |
| MB2 | 0 | 1 | ... | 20 | 2000 |
| MB3 | 0 | 0 | ... | 20 | 2000 |
| MB4 | 0 | 0 | ... | 20 | 3000 |
| MB5 | 0 | 1 | ... | 20 | 3000 |
| MB6 | 1 | 0 | ... | 20 | 150 |
| MB7 | 1 | 0 | ... | 20 | 150 |
| MB8 | 0 | 1 | ... | 20 | 1500 |
| MB9 | 0 | 1 | ... | 20 | 1500 |
|     | SBM = 0<br>FBM = 1 | Unavailable = 0<br>Available = 1 |     |     |     |

FIG. 9

DYNAMIC ALLOCATION OF SUB BLOCKS

BACKGROUND

As three-dimensional NAND memory arrays become more advanced, the number of word lines within each NAND string increases with each generation. For example, a conventional memory array may be capable of storing data on sixty-four word lines, while future memory technologies may have ninety-six word lines for data storage. This increase in word line count results in a larger storage block size. For memory dies having the same capacity, the number of storage blocks may be reduced, posing a challenge at a system level. The concept of a two-tier memory hole may be implemented to allow approximately doubling the number of word lines. In this configuration, a fabrication joint may be located between two tiers of memory layers within a die.

In a multi-die configuration, with the expansion of the number of memory cell layers on either side of the fabrication joint, storage block (also referred to as metablocks) may become very large compared to conventional configurations. Bigger metablocks may result in a number of issues and constraints related to memory yield, bad block management, and block failure handling, due to a greater capacity loss with each failure. Therefore, a solution is needed for designing and handling larger physical, and thus larger logical, memory divisions/metablocks.

BRIEF SUMMARY

This disclosure relates to a method for dynamic allocation of sub-blocks. First, a set of write commands is received by a non-volatile memory array. The non-volatile memory array comprises multiple memory dies organized into metablocks. The metablocks are configured to span two or more memory dies. A workload type is determined for the set of write commands. A target storage block is selected to receive the set of write commands based on the workload type. The selected target storage block is configured to receive data blocks for the workload type, and the set of write commands is directed to the target storage block.

This disclosure further relates to an apparatus comprising a stream manager circuit, a metablock management circuit, a mode circuit, a tracking circuit, and a read/write circuit. The stream manager circuit is configured to monitor write commands and determine that a set of write commands correlate to a sequential workload type. The metablock management circuit is configured to designate a free metablock to receive data for the set of write commands and to erase the free metablock in full-block mode. The mode circuit is configured to send a full-block mode command to multiple memory dies that include a portion of the free metablock. The memory dies are coupled in parallel to an interface bus. The tracking circuit is configured to associate the free metablock with a pair of sister sub-blocks on each of the memory dies. The read/write circuit is configured to write data to the free metablock in full-block mode when the set of write commands is of the sequential workload type.

Finally, this disclosure relates to a system comprising a non-volatile memory array, a set of logical erase blocks, a write data pipeline a stream manager, a block allocation manager, and an open block manager. The non-volatile memory array comprises multiple memory dies organized into at least one row and two or more columns. The logical erase blocks comprise a physical erase block from each memory die of a row of the non-volatile memory array, and each physical erase block comprises two sister sub-blocks.

"Physical erase block" refers to a set of physical pages that are configured to be erased in a single erase operation. In certain embodiments, a physical erase block may be further divided into two or more sub-blocks. In such an embodiment, each sub-block may be erasable independent of other sub-blocks that share the same physical erase block. A collection of physical erase blocks may be used to form a logical erase block.

The write data pipeline is configured to receive write commands and write data into one of the logical erase blocks in sub-block mode. Each of the write commands comprises a logical block address. The stream manager is configured to monitor the write commands, which are received in sequence, to determine the workload type. "Sequence" refers to an order in which a certain activity, event, or operation is performed or carried out.

The stream manager compares logical block addresses from the write commands to logical block addresses of previous write commands. The stream manager then determines that the workload type is sequential based on the comparison of the logical block addresses. The block allocation manager reconfigures one of the logical erase blocks for storage operations in full-block mode and directs write commands of the sequential workload type to the reconfigured logical erase block. The block allocation manager directs the write data pipeline to write data to the reconfigured logical erase block in full-block mode. Finally, the open block manager manages the reconfigured logical erase block in full-block mode.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 9 illustrates a metablock tracking table 900 in accordance with one embodiment.

DETAILED DESCRIPTION

Figure 1:
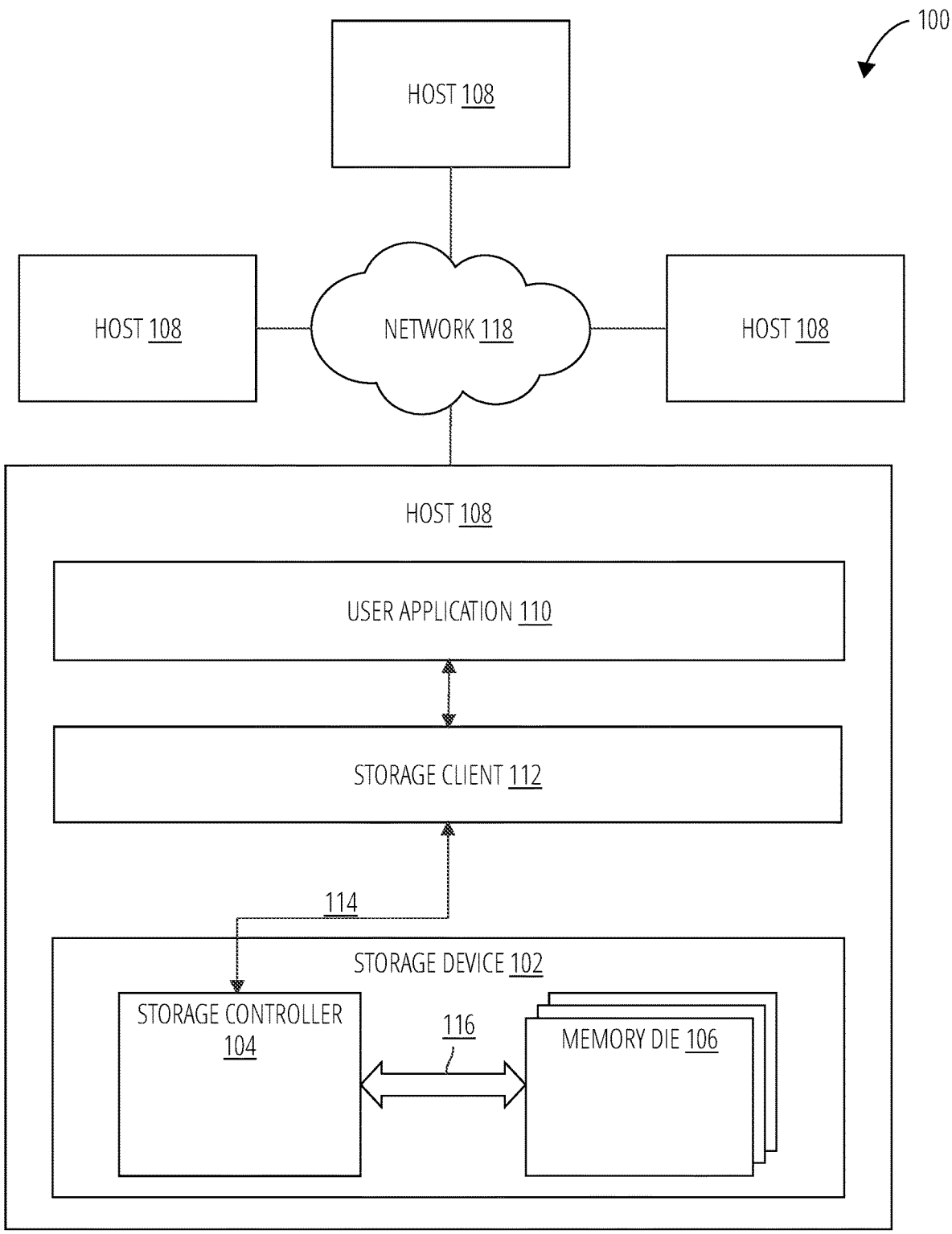
FIG. 1 illustrates a storage system 100 in accordance with one embodiment.

To overcome the challenges posed by memory arrays growing in size, a sub-block mode is disclosed, wherein each physical block may be divided into two or more physical sister sub-blocks. Sister sub-blocks may be used (programmed, erased, and read) independently of each other.

The fabrication joint between the tiers of a two-tier memory hole architecture may be used to divide the physical block into isolated sub-blocks on either side of the joint. This solution has a benefit that, if a sub-block fails, the full physical block may not need to be retired, lessening the impact of such a failure on a storage block budget.

"Sub-block" refers to a logical structure that is a portion of a physical erase block. In certain embodiments, a sub-block is each of the word lines or physical pages of a physical erase block between a joint and a drain side or between the joint and a source side of NAND strings that make up columns of the physical erase block.

In one embodiment, a memory array includes a set of storage cells organized into rows of word lines and columns of NAND strings. Each NAND string has a source-side, a drain-side, and a joint between them. Certain rows of word lines of the memory array together form a physical erase block. Word lines between the joint and the source-side of the physical erase block form a sub-block and word lines between the joint and the drain side of the physical erase block form another sub-block.

A sub-block is physically part of the same physical erase block but can be used to perform a storage operation on one sub-block with little, minimal, manageable, or no impact to storage cells of the physical erase block that are not part of the one sub-block. Storage operations that affect a single sub-block are referred to herein as sub-block mode storage operations or using a sub-block in sub-block mode.

In certain embodiments, a storage controller or die controller may manage, operate, and control sub-blocks by way of configuration settings used for control lines coupled to the storage cells of a memory array during a storage operation. A specific set of configuration settings with one or more particular values may be used to operate sub-blocks within a physical erase block. In one embodiment, these configuration settings are referred to as sub-block mode configuration settings or sub-block configuration settings to differentiate them from full-block mode configuration settings.

In one embodiment, a single physical erase block may include two sub-blocks, each sized to include half of the storage cells of the physical erase block. In another embodiment, a single physical erase block may include more than two sub-blocks, each sized to include a portion of the storage cells of the physical erase block.

"Memory" refers to any hardware, circuit, component, module, logic, device, or apparatus configured, programmed, designed, arranged, or engineered to retain data. Certain types of memory require availability of a constant power source to store and retain the data. Other types of memory retain and/or store the data when a power source is unavailable.

"Memory array" refers to a set of memory cells (also referred to as storage cells) organized into an array structure having rows and columns. Consequently, a non-volatile memory array is a memory array having memory cells configured such that a characteristic (e.g. threshold voltage level, resistance level, conductivity, etc.) of the memory cell used to represent stored data remains a property of the memory cell without a requirement for using a power source to maintain the characteristic.

A memory array is addressable using a row identifier and a column identifier. Those of skill in the art recognize that a memory array may comprise the set of memory cells within a plane, the set of memory cells within a memory die, the set of memory cells within a set of planes, the set of memory cells within a set of memory die, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array. In one embodiment, memory cells within a plurality of memory devices of a storage system may be organized into a memory array.

"Memory cell" refers to a type of storage media configured to represent one or more binary values by way of a determinable physical characteristic of the storage media when the storage media is sensed, read, or detected to determine what binary value(s) was last stored in the memory cell. Memory cell and storage cell are used interchangeably herein.

"Plane" refers to a division of the memory array that permits certain storage operations to be performed on both planes using certain physical row addresses and certain physical column addresses.

"Storage media" refers to any physical media organized and configured to store one or more bits of data. In one embodiment, storage media refers to physical storage cells and/or memory cells used in volatile memory media. In another embodiment, storage media refers to physical storage cells and/or memory cells used in non-volatile memory media.

"Storage operation" refers to an operation performed on a storage cell, or memory cell, in order to change, or obtain, the value of data represented by a state characteristic of the storage cell. Examples of storage operations include but are not limited to reading data from (or sensing a state of) a storage cell, writing (or programming) data to a storage cell, and/or erasing data stored in a storage cell.

To implement a sub-block mode solution in a memory system, certain parameters may need to be set and/or modified in order to independently access each sister sub-block. Setting such parameters for sub-block mode each time this mode is to be implemented may take enough time to have a significant performance impact. For this reason, the sub-block mode-specific parameters may be used as the default.

In some embodiments, the erase time when using sub-block mode may be double the erase time in full-block mode due to constraints in memory architectures that are well understood in the art. In other words, for the same amount of data written, twice the number of erase operations and thus twice the erase time may be needed when operating in sub-block mode as compared to operations in full-block mode, causing significant performance impact when a write workload contains a large number of sequential or pseudo-sequential writes. "Workload" refers to the number and type of storage commands received and/or serviced by the non-volatile storage device and the outcome or results from servicing those storage commands. Workload may also include any statistics about the storage commands.

Using a physical block in sub-block mode may also result in issues such as unerased sub-block disturb (USBD), where erasing a sub-block beyond some threshold value without erasing its sister sub-block may disturb data stored on the sister sub-block. "Threshold" refers to a level, point, or value above which a condition is true or will take place and below which the condition is not true or will not take place.

("threshold." Merriam-Webster.com. Merriam-Webster, 2019. Web. 14 Nov. 2019. Edited)

"Disturb" refers to a type of electronic interference and/or magnetic interference created during, or after, or as a result of, a storage operation and/or a stage of a storage operation. For this reason, erase cycles between sister sub-blocks may need to be performed within some delta value, resulting in additional garbage collection operations, impacting performance, write amplification, and the number of blocks needed for a specific data storage capacity.

"Write amplification" refers to a measure of write/programming operations performed on a non-volatile storage device which result in writing any data, and user data in particular, more times than initially writing the data in a first instance. in certain embodiments, write amplification may count the number of write operations performed by a non-volatile storage device in order to manage and maintain the data stored on the non-volatile storage device. in other embodiments, write amplification measures the amount of data, the number of bits, written that are written beyond an initial storing of data on the non-volatile storage device.

"Garbage collection operation" refers to a storage capacity recovery operation. In a non-volatile memory media, such as NAND, which is a write-once storage media changes to data that has been stored or affirmative instructions to delete data causes data blocks of a storage block to become invalid data.

A garbage collection operation copies valid data from a storage block to a new storage location and arranges for erasure of the storage block. The garbage collection operation may perform the erase operation of the storage block or mark the storage block for subsequent erasure. A garbage collection operation may be referred to herein as a compaction operation.

"Invalid data" refers to data stored in a storage block that a host has affirmatively deleted or has indicated is no longer needed or can be deleted because the data has been superseded by a new or changed version of the data. In non-volatile storage media comprising storage cells that are write once storage media. If data is modified by a host, the modified version of the data causes the original data stored in the write once storage media to become invalid data, the data is invalidated because it no longer represents a current version of the data.

"Valid data" refers to data of a storage block that was stored by a host and should be preserved and maintained until the host indicates that the data is no longer needed, and either can, or should be, deleted.

"Storage block" refers to a set of storage cells organized such that storage operations can be performed on groups of the storage cells in parallel. The organization of the set of storage cells may be implemented at a physical level or a logical level. Thus, a storage block, in one embodiment, may comprise a physical page, such as a word line, a logical page comprising physical pages that span planes and/or memory die, a physical erase block comprising a set of physical pages, a logical erase block (LEB) comprising a set of logical pages, or the like. A storage block may be referred to herein as a "block", a "memory block," a "metablock," or a LEB.

"Storage cell" refers to a type of storage media configured to represent one or more binary values by way of a determinable characteristic of the storage media when the storage media is sensed, read, or detected to determine a binary value(s) stored, or represented by, the determinable characteristic of the memory cell. Storage cell and memory cell are used interchangeably herein.

The type of determinable characteristic used to store data in a memory cell may vary depending on the type of memory or storage technology used. For example, in flash memory cells in which each memory cell comprises a transistor having a source lead, a drain lead and a gate, the determinable characteristic is a voltage level that when applied to the gate causes the memory cell to conduct a current between the drain and the source leads. The voltage level, in this example, is referred to herein as a threshold voltage. A threshold voltage may also be referred to as a control gate reference voltage (CGRV), read voltage, read level, or reference voltage.

Examples of the determinable physical characteristic include, but are not limited to, a threshold voltage for a transistor, an electrical resistance level of a memory cell, a current level through a memory cell, a magnetic pole orientation, a spin-transfer torque, and the like.

"Transistor" refers to an electronic component configured to serve as a signal amplifier or as an electronic switch. A transistor comprises a gate terminal, a source terminal, a drain terminal, and a body terminal or just a body. A transistor may comprise a discrete electronic or semiconductor component or may comprise structures or portions of structures or devices embedded in an integrated circuit or semiconductor component or semiconductor device.

A transistor operating as a switch is configured such that the source terminal electrically connects to a first electrical structure and the drain terminal electrically connects to a second electrical structure. In a switch configuration, a gate terminal of the transistor connects to a control line. The transistor is activated by increasing a voltage on the control line to, or above, a threshold voltage and deactivated by decreasing the voltage on the control line below a threshold voltage. Activation of a transistor by way of the control line is referred to herein as placing the transistor in an on state.

Activation of the transistor forms an electrically conductive path and/or causes the transistor to conduct a current and/or permit a voltage, or bias, to transfer between the source terminal and the drain terminal.

The solution disclosed herein may address these problems with sub-block mode usage and may provide a way of blending sub-block mode and full-block mode to overcome these challenges. "Sub-block mode" refers to a way, process, method, or manner of operating an array of storage cells such that storage operations on a first set of storage cells of the array is independent of storage operations on a second set of storage cell in the same physical array as the first set of storage cells.

In one embodiment, a memory array includes a set of storage cells organized into rows of word lines and columns of NAND strings, each NAND string having a source-side, a drain-side, and a joint between them. Certain rows of word lines of the memory array together form a physical erase block. When a die controller operates the physical erase block in sub-block mode, word lines between the joint and the source-side of the physical erase block form a first sub-block and word lines between the joint and the drain-side of the physical erase block form a second sub-block.

In one embodiment, a die controller operates a physical erase block in sub-block mode by biasing control lines coupled to the physical erase block such that storage operations that involve one sub-block have no impact, a minimal impact, and/or a mitigated impact on storage cells in another sub-block that is physically part of the same physical erase block. Said another way, the die controller operates the physical erase block is such a way, with biasing of control lines and timing for parts of a storage operation such that execution of the storage operation on one sub-block causes minimal, or no disturb, to data or storage cell settings of a second sub-block in the same physical erase block.

"Full-block mode" refers to a way, process, method, or manner of operating an array of storage cells such that data values encoded in storage cells of a set of storage cells of the memory array is erasable in a single erase storage operation.

In one embodiment, an array includes a set of storage cells organized into rows of word lines and columns of NAND strings, each NAND string having a source-side, a drain-side, and a joint between them. Certain rows of word lines of the memory array together form a physical erase block. When a die controller operates the physical erase block in full-block mode, word lines between the joint and the source-side and word lines between the joint and the drain-side together, form the physical erase block.

In one embodiment, a die controller operates a physical erase block in full-block mode by biasing control lines coupled to the physical erase block such that an erase storage operation impacts the storage cells of the physical erase block as a unit. In certain embodiments, operating a physical erase block in full-block mode is analogous to reading data from, writing data to, and erasing storage cells of a physical erase block.

In certain embodiments, a full-block mode storage operation may be performed on a single physical erase block of single array of storage cells of a single memory die. Alternatively, or in addition, a full-block mode storage operation may be performed on a plurality of physical erase blocks of plurality of arrays of storage cells of a plurality of memory dies organized and configured such that a single storage operation from a storage controller operates on the plurality of physical erase blocks in parallel. In such an embodiment and configuration, the plurality of physical erase blocks are referred to as logical erase blocks, metablocks, or super-blocks.

"Logical erase block" refers to another term for a storage block. In certain embodiments, a logical erase block refers to a set of logical pages that span planes, memory die, and/or chips. This organization of storage cells is deemed 'logical' because the physical pages may not be directly coupled to each other. The logical relationship among the physical pages may be tracked in a table or other mapping or may be inherent due to the location of the physical pages in a memory die or memory array and the architecture that connected multiple memory die or memory arrays.

The physical pages may comprise word lines and are operated in parallel as though they are a single logical page spanning memory die and/or memory planes and/or memory arrays. In like manner, multiple physical erase blocks spanning memory die and/or memory planes and/or memory arrays may be operated in parallel as though they are a single erase block and are thus referred to as logical erase blocks. The terms logical erase block, metablock, and super block are used interchangeably herein.

"Logical page" refers to a collection of physical pages that are treated as a single page for storage operations.

"Metablock" refers to a set of storage cells organized such that storage operations can be performed on groups of the storage cells in parallel. A metablock is a logical structure that organizes the set of storage cells at a logical level. In one embodiment, a metablock is a smallest storage unit that can be erased in a single erase storage operation.

In one embodiment, a metablock is a collection of physical erase blocks from two or more different physical planes, memory die, or chips. Thus, a metablock, in one embodiment, may span memory planes, memory die, or memory chips of a memory array. In one embodiment, a metablock is a collection of physical erase blocks along a row of a memory array of memory die. A metablock may be referred to herein as a "block", a "memory block," a "logical erase block," or a LEB.

FIG. 1 is a schematic block diagram illustrating one embodiment of a storage system 100 that includes a storage device in accordance with the disclosed solution. The storage system 100 comprises a storage device 102, a storage controller 104, a memory die 106, a host 108, a user application 110, a storage client 112, a data bus 114, a bus 116, and a network 118. "Host" refers to any computing device or computer device or computer system configured to send and receive storage commands. Examples of a host include, but are not limited to, a computer, a laptop, a mobile device, an appliance, a virtual machine, an enterprise server, a desktop, a tablet, a main frame, and the like.

"Storage command" refers to any command relating with a storage operation. Examples of storage commands include, but are not limited to, read commands, write commands, maintenance commands, configuration command, administration command, diagnostic commands, test mode commands, countermeasure command, and any other command a storage controller may receive from a host or issue to another component, device, or system.

"Write command" refers to a storage command configured to direct the recipient to write, or store, one or more data blocks on a persistent storage media, such as a hard disk drive, non-volatile memory media, or the like. A write command may include any storage command that may result in data being written to physical storage media of a storage device. The write command may include enough data to fill one or more data blocks, or the write command may include enough data to fill a portion of one or more data blocks. In one embodiment, a write command includes a starting LBA and a count indicating the number of LBA of data to write to on the storage media.

The storage system 100 includes at least one storage device 102, comprising a storage controller 104 and one or more memory dies 106, connected by a bus 116. "Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on.

"Memory die" refers to a small piece of semiconducting material on which a given functional circuit is fabricated. Typically, integrated circuits are produced in large batches on a single wafer of electronic-grade silicon (EGS) or other semiconductor (such as GaAs) through processes such as photolithography. The wafer is cut (diced) into many pieces, each containing one copy of the circuit. Each of these pieces is called a die or memory die. (Search "die (integrated circuit)" on Wikipedia.com Oct. 9, 2019. Accessed Nov. 18, 2019.)

A memory die is a die, in one embodiment, that includes one or more functional circuits for operating as a non-volatile memory media and/or a non-volatile memory array. "Non-volatile memory array" refers to a set of non-volatile storage cells (also referred to as memory cells or non-volatile memory cells) organized into an array structure having rows and columns. A memory array is addressable using a row identifier and a column identifier.

"Non-volatile memory media" refers to any hardware, device, component, element, or circuit configured to maintain an alterable physical characteristic used to represent a binary value of zero or one after a primary power source is removed. Examples of the alterable physical characteristic include, but are not limited to, a threshold voltage for a transistor, an electrical resistance level of a memory cell, a current level through a memory cell, a magnetic pole orientation, a spin-transfer torque, and the like.

The alterable physical characteristic is such that, once set, the physical characteristic stays sufficiently fixed such that when a primary power source for the non-volatile memory media is unavailable the alterable physical characteristic can be measured, detected, or sensed, when the binary value is read, retrieved, or sensed. Said another way, non-volatile memory media is a storage media configured such that data stored on the non-volatile memory media) is retrievable after a power source for the non-volatile memory media is removed and then restored. Non-volatile memory media may comprise one or more non-volatile memory elements, which may include, but are not limited to: chips, packages, planes, memory die, and the like.

Examples of non-volatile memory media include but are not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random-access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like.

While the non-volatile memory media is referred to herein as "memory media," in various embodiments, the non-volatile memory media may more generally be referred to as non-volatile memory. Because non-volatile memory media is capable of storing data when a power supply is removed, the non-volatile memory media may also be referred to as a recording media, non-volatile recording media, non-volatile storage media, storage, non-volatile memory, volatile memory medium, non-volatile storage medium, non-volatile storage, or the like.

In certain embodiments, data stored in non-volatile memory media is addressable at a block level which means that the data in the non-volatile memory media is organized into data blocks that each have a unique logical address (e.g., LBA). In other embodiments, data stored in non-volatile memory media is addressable at a byte level which means that the data in the non-volatile memory media is organized into bytes (8 bits) of data that each have a unique address, such as a logical address. One example of byte addressable non-volatile memory media is storage class memory (SCM). "Non-volatile memory array" refers to a set of non-volatile storage cells (also referred to as memory cells or non-volatile memory cells) organized into an array structure having rows and columns. A memory array is addressable using a row identifier and a column identifier.

In some embodiments, each storage device 102 may include two or more memory dies 106, such as flash memory, nano random-access memory ("nano RAM or NRAM"), magneto-resistive RAM ("MRAM"), dynamic RAM ("DRAM"), phase change RAM ("PRAM"), etc. In further embodiments, the data storage device 102 may include other types of non-volatile and/or volatile data storage, such as dynamic RAM ("DRAM"), static RAM ("SRAM"), magnetic data storage, optical data storage, and/or other data storage technologies.

The storage device 102, also referred to herein as a storage device, may be a component within a host 108 as depicted in here, and may be connected using a data bus 114, such as a peripheral component interconnect express ("PCIe") bus, a Serial Advanced Technology Attachment ("serial ATA") bus, or the like. In another embodiment, the storage device 102 is external to the host 108 and is connected, a universal serial bus ("USB") connection, an Institute of Electrical and Electronics Engineers ("IEEE") 1394 bus ("FireWire"), or the like. In other embodiments, the storage device 102 is connected to the host 108 using a peripheral component interconnect ("PCI") express bus using external electrical or optical bus extension or bus networking solution such as InfiniBand or PCI Express Advanced Switching ("PCIe-AS"), or the like.

In various embodiments, the storage device 102 may be in the form of a dual-inline memory module ("DIMM"), a daughter card, or a micro-module. In another embodiment, the storage device 102 is a component within a rack-mounted blade. In another embodiment, the storage device 102 is contained within a package that is integrated directly onto a higher-level assembly (e.g., mother board, laptop, graphics processor). In another embodiment, individual components comprising the storage device 102 are integrated directly onto a higher-level assembly without intermediate packaging. The storage device 102 is described in further detail with regard to FIG. 2.

"Processor" refers to any circuitry, component, chip, die, package, or module configured to receive, interpret, decode, and execute machine instructions. Examples of a processor may include, but are not limited to, a central processing unit, a general-purpose processor, an application-specific processor, a graphics processing unit (GPU), a field programmable gate array (FPGA), Application Specific Integrated Circuit (ASIC), System on a Chip (SoC), virtual processor, processor core, and the like.

In a further embodiment, instead of being connected directly to the host 108 as DAS, the data storage device 102 may be connected to the host 108 over a data network. For example, the data storage device 102 may include a storage area network ("SAN") storage device, a network attached storage ("NAS") device, a network share, or the like. In one embodiment, the storage system 100 may include a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host 108 and the data storage device 102.

The storage system 100 includes at least one host 108 connected to the storage device 102. Multiple hosts 108 may be used and may comprise a server, a storage controller of a storage area network ("SAN"), a workstation, a personal computer, a laptop computer, a handheld computer, a super-computer, a computer cluster, a network switch, router, or appliance, a database or storage appliance, a data acquisition or data capture system, a diagnostic system, a test system, a robot, a portable electronic device, a wireless device, or the like. In another embodiment, a host 108 may be a client and the storage device 102 operates autonomously to service data requests sent from the host 108. In this embodiment, the host 108 and storage device 102 may be connected using a computer network, system bus, Direct Attached Storage (DAS) or other communication means suitable for connection between a computer and an autonomous storage device 102.

The depicted embodiment shows a user application 110 in communication with a storage client 112 as part of the host 108. In one embodiment, the user application 110 is a software application operating on or in conjunction with the storage client 112. "Storage client" refers to any hardware, software, firmware, or logic component or module configured to communicate with a storage device in order to use storage services. Examples of a storage client include, but are not limited to, operating systems, file systems, database applications, a database management system ("DBMS"), server applications, a server, a volume manager, kernel-level processes, user-level processes, applications, mobile applications, threads, processes, and the like. "Software" refers to logic implemented as processor-executable instructions in a machine memory (e.g. read/write volatile memory media or non-volatile memory media).

The storage client 112 manages files and data and utilizes the functions and features of the storage controller 104 and associated memory dies 106. Representative examples of storage clients include, but are not limited to, a server, a file system, an operating system, a database management system ("DBMS"), a volume manager, and the like. The storage client 112 is in communication with the storage controller 104 within the storage device 102. In some embodiments, the storage client 112 may include remote storage clients operating on hosts 108 or otherwise accessible via the network 118. Storage clients may include, but are not limited to operating systems, file systems, database applications, server applications, kernel-level processes, user-level processes, applications, and the like.

In one embodiment, the storage system 100 includes one or more clients connected to one or more hosts 108 through one or more computer networks 118. A host 108 may be a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The network 118 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The network 118 may also include a network from the IEEE 802 family of network technologies, such Ethernet, token ring, WiFi, WiMax, and the like.

The network 118 may include servers, switches, routers, cabling, radios, and other equipment used to facilitate networking the host 108 or hosts and host 108 or clients. In one embodiment, the storage system 100 includes multiple hosts that communicate as peers over a network 118. In another embodiment, the storage system 100 includes multiple memory devices 102 that communicate as peers over a network 118. One of skill in the art will recognize other computer networks comprising one or more computer networks and related equipment with single or redundant connection between one or more clients or other computer with one or more memory devices 102 or one or more memory devices 102 connected to one or more hosts. In one embodiment, the storage system 100 includes two or more memory devices 102 connected through the network 118 to a host 108 without a host 108.

In one embodiment, the storage client 112 communicates with the storage controller 104 through a host interface comprising an Input/Output (I/O) interface. For example, the storage device 102 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

In certain embodiments, the storage media of a memory device is divided into volumes or partitions. Each volume or partition may include a plurality of sectors. Traditionally, a sector is 512 bytes of data. One or more sectors are organized into a block (referred to herein as both block and data block, interchangeably). "Data block" refers to a smallest physical amount of storage space on physical storage media that is accessible, and/or addressable, using a storage command. The physical storage media may be volatile memory media, non-volatile memory media, persistent storage, nonvolatile storage, flash storage media, hard disk drive, or the like. Certain conventional storage devices divide the physical storage media into volumes or logical partitions (also referred to as partitions). Each volume or logical partition may include a plurality of sectors. One or more sectors are organized into a block (also referred to as a data block). In certain storage systems, such as those interfacing with the Windows® operating systems, the data blocks are referred to as clusters. In other storage systems, such as those interfacing with UNIX, Linux, or similar operating systems, the data blocks are referred to simply as blocks. A data block or cluster represents a smallest physical amount of storage space on the storage media that is managed by a storage controller. A block storage device may associate n data blocks available for user data storage across the physical storage media with a logical block address (LBA), numbered from 0 to n. In certain block storage devices, the logical block addresses may range from 0 to n per volume or logical partition. In conventional block storage devices, a logical block address maps directly to one and only one data block. "Logical block address" refers to a value used in a block storage device to associate each of n logical blocks available for user data storage across the storage media with a logical address. In certain block storage devices, the logical block addresses (LBAs) may range from 0 to n per volume or partition. In block storage devices, each LBA maps directly to a particular data block, and each data block maps to a particular set of physical sectors, or physical data block addresses on the physical storage media. "User data" refers to data that a host directs a non-volatile storage device to store or record.

In one example embodiment, a data block includes eight sectors which is 4 KB. In certain storage systems, such as those interfacing with the Windows® operating systems, the data blocks are referred to as clusters. In other storage systems, such as those interfacing with UNIX, Linux, or similar operating systems, the data blocks are referred to simply as blocks. A block or data block or cluster represents a smallest physical amount of storage space on the storage media that is managed by a storage manager, such as a storage controller, storage system, storage unit, storage device, or the like.

In some embodiments, the storage controller 104 may be configured to store data on one or more asymmetric, write-once storage media, such as solid-state storage memory cells within the memory die 106. "Write once storage media" refers to a storage media such as a storage cell that is reinitialized (e.g., erased) before new data or a change to the data is written or programmed thereon. In other words, data of a write once storage media cannot be overwritten, the write once storage media must be erased before subsequently writing data to the write once storage media. "Asymmetric storage media" refers to a storage media having different latencies for different storage operations. Many types of solid-state storage media (e.g., memory dies) are asymmetric; for example, a read operation may be much faster than a write/program operation, and a write/program operation may be much faster than an erase operation (e.g., reading the storage media may be hundreds of times faster than erasing, and tens of times faster than programming the storage media).

"Program" refers to a storage operation in which a characteristic of a memory cell is changed from a first state (often, an erased state) to a second state. A program storage operation may also be referred to as a write operation herein.

In certain embodiments, a program storage operation may include a series of iterations that incrementally change the characteristic until at least a target level of change is achieved. In other embodiments, a program storage operation may cause the attribute to change to a target level with a single iteration.

The memory die 106 may be partitioned into memory divisions that can be erased as a group (e.g., erase blocks) in order to, inter alia, account for the asymmetric properties of the memory die 106 or the like. As such, modifying a single data segment in-place may require erasing the entire erase block comprising the data, and rewriting the modified data to the erase block, along with the original, unchanged data. This may result in inefficient write amplification, which may excessively wear the memory die 106.

"Erase block" refers to a logical erase block or a physical erase block. In one embodiment, a physical erase block represents the smallest storage unit within a given memory die that can be erased at a given time (e.g., due to the wiring of storage cells on the memory die). In one embodiment, logical erase blocks represent the smallest storage unit, or storage block, erasable by a storage controller in response to receiving an erase command. In such an embodiment, when the storage controller receives an erase command specifying a particular logical erase block, the storage controller may erase each physical erase block within the logical erase block simultaneously. It is noted that physical erase blocks within a given logical erase block may be considered as contiguous within a physical address space even though they reside in separate dies. Thus, the term "contiguous" may be applicable not only to data stored within the same physical medium, but also to data stored within separate media.

Therefore, in some embodiments, the storage controller 104 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

Management of a data block by a storage manager includes specifically addressing a particular data block for a read operation, write operation, or maintenance operation. "Maintenance operation" refers to an operation performed on a non-volatile storage device that is configured, designed, calibrated, or arranged to improve or extend the life of the non-volatile storage device and/or data stored thereon.

A block storage device may associate n blocks available for user data storage across the storage media with a logical address, numbered from 0 to n. In certain block storage devices, the logical addresses may range from 0 to n per volume or partition. "Logical address" refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like. A logical address does not indicate the physical location of data on the storage media but is an abstract reference to the data.

In conventional block storage devices, a logical address maps directly to a particular data block on physical storage media. In conventional block storage devices, each data block maps to a particular set of physical sectors on the physical storage media. However, certain storage devices do not directly or necessarily associate logical addresses with particular physical data blocks. These storage devices may emulate a conventional block storage interface to maintain compatibility with a block storage client 112.

In one embodiment, the storage controller 104 provides a block I/O emulation layer, which serves as a block device interface, or API. In this embodiment, the storage client 112 communicates with the storage device through this block device interface. In one embodiment, the block I/O emulation layer receives commands and logical addresses from the storage client 112 in accordance with this block device interface. As a result, the block I/O emulation layer provides the storage device compatibility with a block storage client 112.

In one embodiment, a storage client 112 communicates with the storage controller 104 through a host interface comprising a direct interface. In this embodiment, the storage device directly exchanges information specific to non-volatile storage devices. "Non-volatile storage device" refers to any hardware, device, component, element, or circuit configured to maintain an alterable physical characteristic used to represent a binary value of zero or one after a primary power source is removed. Examples of a non-volatile storage device include, but are not limited to, a hard disk drive (HDD), Solid-State Drive (SSD), non-volatile memory media, and the like.

A storage device using direct interface may store data in the memory die 106 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die 106. "Characteristic" refers to any property, trait, quality, or attribute of an object or thing. Examples of characteristics include, but are not limited to, condition, readiness for use, unreadiness for use, size, weight, composition, feature set, and the like.

The storage controller 104 receives a logical address and a command from the storage client 112 and performs the corresponding operation in relation to the memory die 106. The storage controller 104 may support block I/O emulation, a direct interface, or both.

Figure 2:
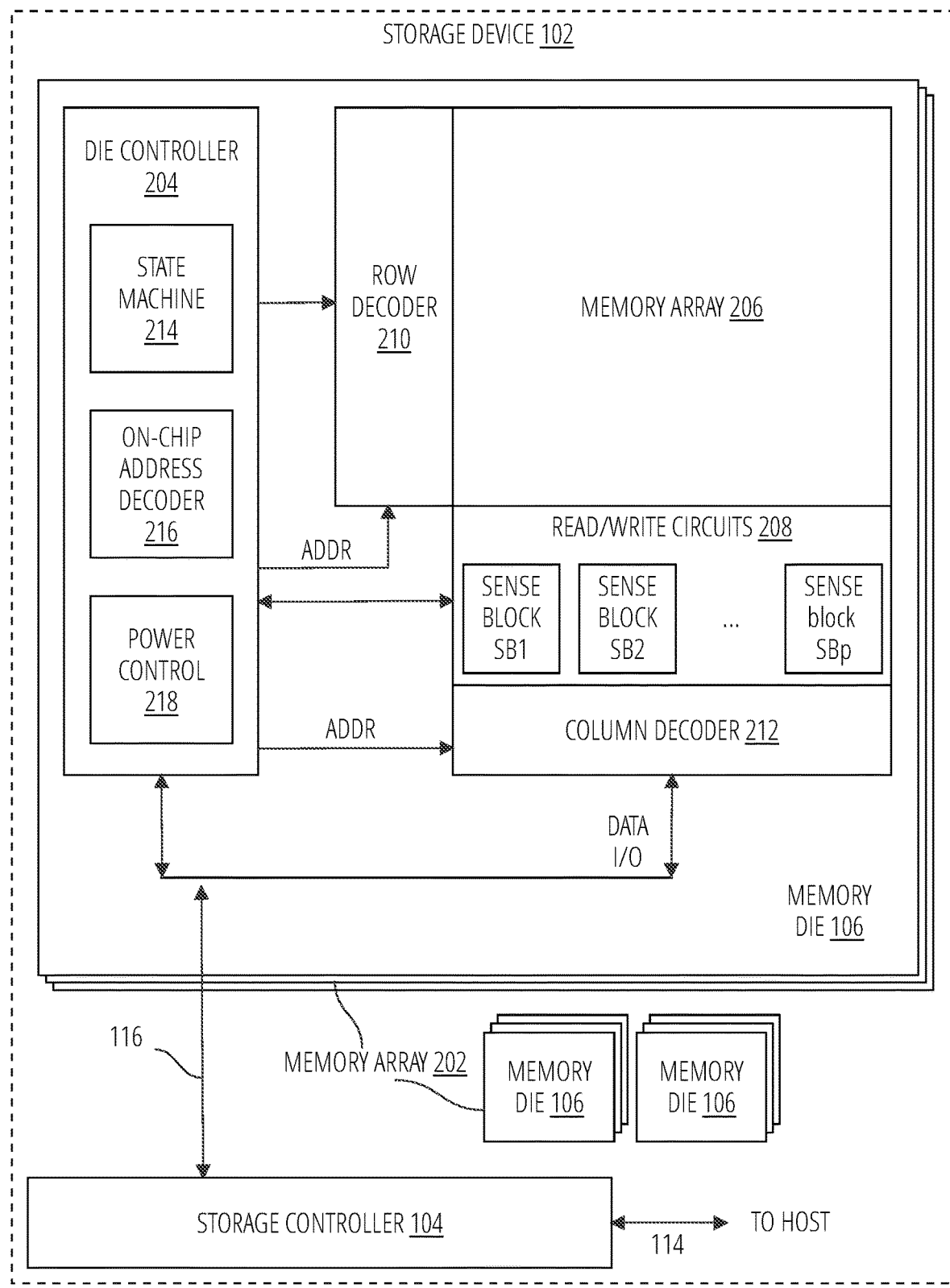
FIG. 2 is a block diagram of an example storage device 102 in one embodiment.

FIG. 2 is a block diagram of an exemplary storage device 102. "Storage device" refers to any hardware, system, sub-system, circuit, component, module, non-volatile memory media, hard disk drive, storage array, device, or apparatus configured, programmed, designed, or engineered to store data for a period of time and retain the data in the storage device while the storage device is not using power from a power supply. Examples of storage devices include, but are not limited to, a hard disk drive, FLASH memory, MRAM memory, a Solid-State storage device, Just a Bunch Of Disks (JBOD), Just a Bunch Of Flash (JBOF), an external hard disk, an internal hard disk, and the like.

The storage device 102 may include a storage controller 104 and a memory array 202. Each memory die 106 in the memory array 202 may include a die controller 204 and at least one non-volatile memory array 206 in the form of a three-dimensional memory array, and read/write circuits 208. "Three-dimensional memory array" refers to a physical arrangement of components of a memory array which contrasts with a two-dimensional (2-D) memory array. 2-D memory arrays are formed along a planar surface of a semiconductor wafer or other substrate. A three-dimensional (3-D) memory array extends up from the wafer surface/substrate and generally includes stacks, or columns, of memory cells extending upwards, in a z-direction. In a 3-D memory array word lines comprise layers stacked one on the other as the memory array extends upwards. Various 3-D arrangements are possible. In one arrangement a NAND string is formed vertically with one end (e.g., source) at the wafer surface and the other end (e.g., drain) on top.

"Threshold voltage" refers to a voltage level that when applied to a gate electrode of a transistor causes the transistor to conduct a current between the drain electrode and source electrode.

Consequently, a non-volatile memory array is a memory array having memory cells configured such that a characteristic (e.g., threshold voltage level, resistance level, conductivity, etc.) of the memory cell used to represent stored data remains a property of the memory cell without a requirement for using a power source to maintain the characteristic.

A memory array is addressable using a row identifier and a column identifier. Those of skill in the art recognize that a memory array may comprise the set of memory cells within a plane, the set of memory cells within a memory die, the set of memory cells within a set of planes, the set of memory cells within a set of memory dies, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array. In one embodiment, memory cells within a plurality of memory devices of a storage system may be organized into a memory array.

The non-volatile memory array 206 is addressable by word line via a row decoder 210 and by bit line via a column decoder 212. "Bit line" refers to a circuit structure configured to deliver a voltage and/or conduct current to a column of a memory array. In one embodiment, the column comprises a NAND string or memory string and may also be referred to as channel. In one embodiment, the column is referred to as a NAND string and the NAND string comprises a channel. In one embodiment, a bit line connects to a NAND string at a drain end or drain side of the NAND string. A memory array may have one bit line for each memory cell along the word lines of the memory array. "Word line" refers to a structure within a memory array comprising a set of memory cells. The memory array is configured such that the operational memory cells of the word line are read or sensed during a read operation. Similarly, the memory array is configured such that the operational memory cells of the word line are read, or sensed, during a read operation. A word line may also be referred to as a physical page or page for short.

"Channel" refers to a structure within a memory array that extends from a source side to a drain side. In one embodiment, a channel is a vertical column within a memory array that forms a conductive path between a source line coupled to one end of a NAND string and a bit line coupled to another end of the NAND string. A channel may be formed from a variety of materials including, for example, polysilicon.

In one embodiment, a channel within a NAND string creates a conductive path by activating one or more memory cells (e.g., one or more selected memory cells and unselected memory cells) along the NAND string, and one or more control structures (e.g., select gates (source and/or drain) between a source line connected to one end (e.g., the source side) of the NAND string and a sense amplifier or bit line connected to the other end (e.g., the drain side) of the NAND string.

"Select gate" refers to a transistor structurally and/or electrically configured to function as a switch to electrically connect a first electrical structure connected to a source terminal of the transistor to a second electrical structure connected to the drain terminal. When functioning as a switch, the transistor is referred to herein as a 'select gate' and serves to gate (selectively) or control when, and in what quantity, a current flows or a voltage passes between the first electrical structure and the second electrical structure. Depending on the context, references to select gate herein may refer to the whole transistor or to the gate terminal of the transistor.

The read/write circuits 208 include multiple sense blocks SB1, SB2, . . . , SBp (sensing circuitry) and allow a page of memory cells to be read or programmed in parallel. "Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment). In certain embodiments, each memory cell across a row of the memory array together form a physical page. "Read/write circuit" refers to a device, component, element, module, system, sub-system, circuitry, logic, hardware, or circuit configured and/or operational to read data from and write data to a storage media, such as storage cells of a storage array.

A physical page may include memory cells along a row of the memory array for a single plane or for a single memory die. In one embodiment, the memory die includes a memory array made up of two equal sized planes. In one embodiment, a physical page of one plane of a memory die includes four data blocks (e.g., 16 KB). In one embodiment, a physical page (also called a "die page") of a memory die includes two planes each having four data blocks (e.g., 32 KB).

Commands and data are transferred between the host 108 and storage controller 104 via a data bus 114, and between the storage controller 104 and the one or more memory dies 106 via bus 116. The storage controller 104 may comprise the logical modules described in more detail with respect to FIG. 1.

The non-volatile memory array 206 can be two-dimensional (2D—laid out in a single fabrication plane) or three-dimensional (3D—laid out in multiple fabrication planes). The non-volatile memory array 206 may comprise one or more arrays of memory cells including a 3D array. In one embodiment, the non-volatile memory array 206 may comprise a monolithic three-dimensional memory structure (3D array) in which multiple memory levels are formed above (and not in) a single substrate, such as a wafer, with no intervening substrates. The non-volatile memory array 206 may comprise any type of non-volatile memory that is monolithically formed in one or more physical levels of arrays of memory cells having an active area disposed above a silicon substrate. The non-volatile memory array 206 may be in a non-volatile solid-state drive having circuitry associated with the operation of the memory cells, whether the associated circuitry is above or within the substrate.

Word lines may comprise sections of the layers containing memory cells, disposed in layers above the substrate. Multiple word lines may be formed on single layer by means of trenches or other non-conductive isolating features.

The die controller 204 cooperates with the read/write circuits 208 to perform memory operations on memory cells of the non-volatile memory array 206, and includes a state machine 214, an address decoder 216, and a power control 218. The state machine 214 provides chip-level control of memory operations. "Die controller" refers to a set of circuits, circuitry, logic, or components configured to manage the operation of a die. In one embodiment, the die controller is an integrated circuit. In another embodiment, the die controller is a combination of discrete components. In another embodiment, the die controller is a combination of one or more integrated circuits and one or more discrete components.

The address decoder 216 provides an address interface between that used by the host or a storage controller 104 to the hardware address used by the row decoder 210 and column decoder 212. "Hardware" refers to functional elements embodied as analog and/or digital circuitry.

The power control 218 controls the power and voltages supplied to the various control lines during memory operations. "Control line" refers to a structure, circuit, circuitry, and/or associated logic configured to convey an electrical current and/or voltage from a source to a destination. In certain embodiments, analog voltages, currents, biases, and/or digital signals supplied or discharged over a control line are used to control switches, select gates, and/or other electrical components. Certain control lines may have a specific name based on what parts of a circuit the control line controls or where the control line couples, or connects, to other circuits. Examples of named control lines include word lines, bit lines, source control lines, drain control lines, and the like.

"Source control line" refers to a control line configured to operate a select gate (e.g., turn the select gate on, activate, and off, deactivate) for coupling a source side of a NAND string to a source line and/or another circuit.

"Source side" refers to the end of a NAND string or side of a three-dimensional memory array connected to the source layer or line on a memory die. The term comes from the source terminal of a field effect transistor or similar component. In a daisy-chained string of transistors, the source terminal of the first transistor may be connected to a source line, a ground or some other lower voltage line, and the drain terminal may be connected to the source terminal of the next transistor, that transistor's drain terminal may be connected to the next source terminal and so on, with the drain terminal of the final transistor connected to a higher voltage signal or power line. The gate terminal of each transistor may then control whether or not current flows through the transistor from source to drain, and through the string from source line to bit line.

"Source line" refers to a structure, circuit, circuitry, and/or associated logic configured to convey an electrical current and/or voltage from a supply to one or more channels of associated NAND strings. In certain embodiments, a source line is configured to convey a voltage to, and/or discharge a voltage from multiple NAND strings concurrently. In other embodiments, a source line is configured to convey a voltage to, and/or discharge a voltage from multiple NAND strings in series.

In certain embodiments, a source control line couples to one or more source-side select gates that are between the source line and one or more NAND strings and the source control line manages whether voltage or current passes between the source line and the NAND string. In such an embodiment, the source line may also be referred to as a common source line.

"Source-side select gate" refers to a select gate functioning as a switch to electrically connect a source line to a NAND string and/or a channel of a NAND string. Examples of source lines include source-side select gates, dummy word line select gates, and the like. In certain embodiments, a source-side select gate may comprise just source-side select gates (e.g., SGS0, SGS1, etc.). In other embodiments, a source-side select gate may comprise just dummy word line select gates (e.g., DWLS0, DWLS1, etc.). In still other embodiments, a source-side select gate may comprise both source-side select gates (e.g., SGS0, SGS1, etc.) and dummy word line select gates (e.g., DWLS0, DWLS1, etc.). A select gate positioned between the source line and the NAND string on the source side of the NAND string is referred to as a source-side select gate.

"Drain control line" refers to a control line configured to operate a select gate (e.g., turn the select gate on, activate, and off, deactivate) for coupling a drain side of a NAND string to a bit line and/or a sense circuit. "Drain side" refers to the end of a NAND string or side of a three-dimensional memory array connected to the bit line(s). The term comes from the drain terminal of a field effect transistor or similar component. In a daisy-chained string of transistors, the source terminal of the first transistor may be connected to a source line, a ground or some other lower voltage line, and the drain terminal may be connected to the source terminal of the next transistor, that transistor's drain terminal may be connected to the next source terminal and so on, with the drain terminal of the final transistor connected to a higher voltage signal or power line. The gate terminal of each transistor may then control whether or not current flows through the transistor from source to drain, and through the string from source line to bit line.

"Drain-side select gate" refers to a select gate functioning as a switch to electrically connect a bit line to a NAND string and/or a channel of a NAND string. A select gate positioned between the bit line and the NAND string on the drain side of the NAND string is referred to as a drain-side select gate.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

The power control 218 and/or read/write circuits 208 can include drivers for word lines, source gate select (SGS) transistors, drain gate select (DGS) transistors, bit lines, substrates (in 2D memory structures), charge pumps, and source lines. In certain embodiments, the power control 218 may detect a sudden loss of power and take precautionary actions. The power control 218 may include various first voltage generators (e.g., the drivers) to generate the voltages described herein. The sense blocks can include bit line drivers and sense amplifiers in one approach.

In some implementations, some of the components can be combined. In various designs, one or more of the components (alone or in combination), other than non-volatile memory array 206, can be thought of as at least one control circuit or storage controller which is configured to perform the techniques described herein. For example, a control circuit may include any one of, or a combination of, die controller 204, state machine 214, address decoder 216, column decoder 212, power control 218, sense blocks SB1, SB2, . . . , SBp, read/write circuits 208, storage controller 104, and so forth.

In one embodiment, the host 108 is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the storage controller 104 to perform the methods described herein. The host may also include additional system memory, one or more input/output interfaces and/or one or more input/output devices in communication with the one or more processors, as well as other components well known in the art.

Associated circuitry is typically required for operation of the memory cells and for communication with the memory cells. As non-limiting examples, memory devices may have circuitry used for controlling and driving memory cells to accomplish functions such as programming and reading. This associated circuitry may be on the same substrate as the memory cells and/or on a separate substrate. For example, a storage controller for memory read-write operations may be located on a separate storage controller chip and/or on the same substrate as the memory cells.

One of skill in the art will recognize that the disclosed techniques and devices are not limited to the two-dimensional and three-dimensional exemplary structures described but covers all relevant memory structures within the spirit and scope of the technology as described herein and as understood by one of skill in the art.

Figure 3:
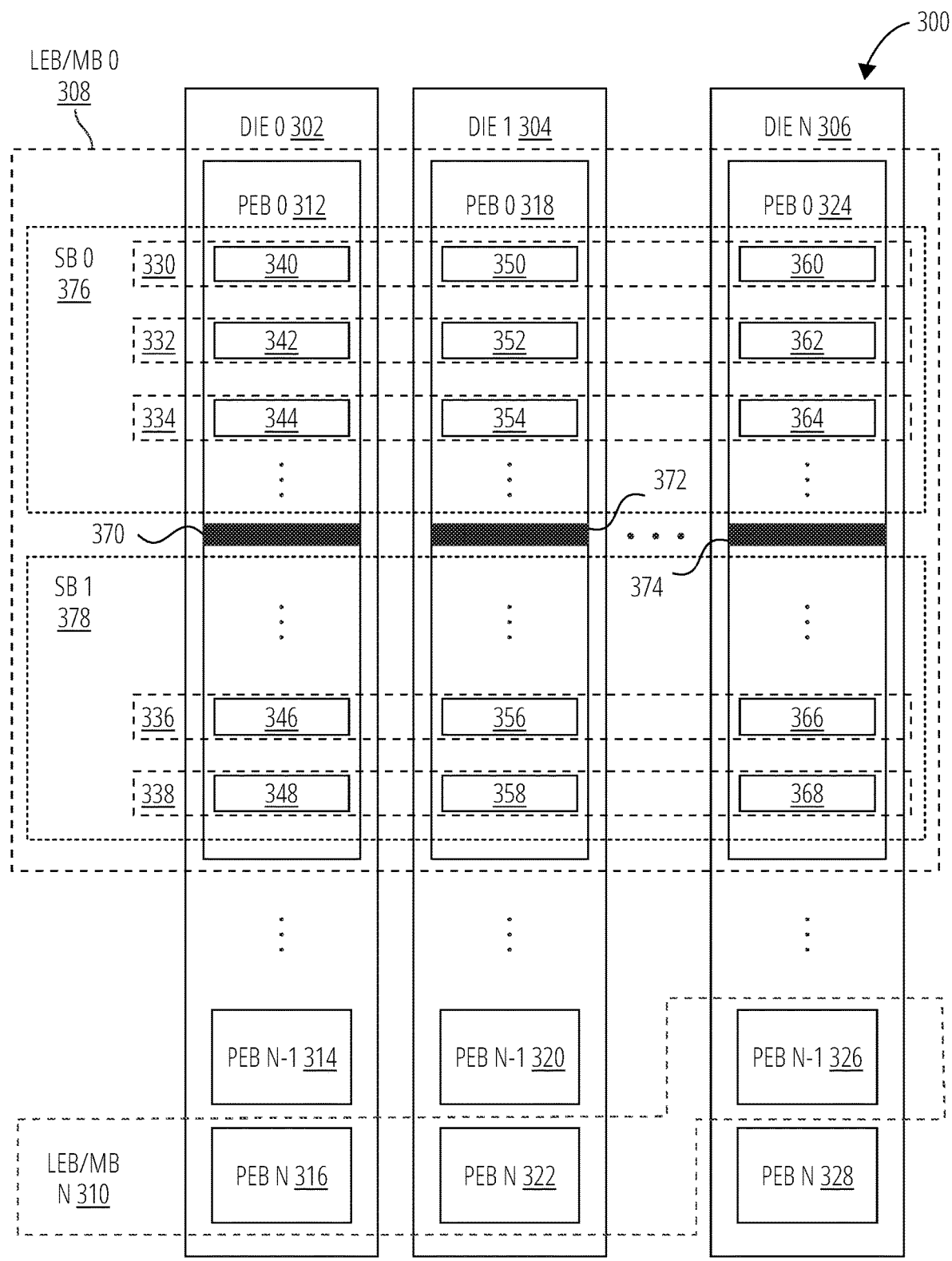
FIG. 3 illustrates a memory array 300 in accordance with one embodiment.

FIG. 3 illustrates a memory array 300 in accordance with one embodiment. The memory array 300 comprises die 0 302, die 1 304, etc., through die N 306. In the illustrated embodiment, memory array 300 is organized into logical erase blocks (LEBs) (also referred to herein as "metablocks" ("MBs") or "superblocks"), as shown by logical erase block/metablock 0 308 and logical erase block/metablock N 310. These LEBs include multiple physical erase blocks (PEBs) illustrated by physical erase block 0 312, physical erase block n−1 314, physical erase block n 316, physical erase block 0 318, physical erase block n−1 320, physical erase block n 322, physical erase block 0 324, physical erase block n−1 326, and physical erase block n 328. An LEB may include PEBs within a single row, such as logical erase block/metablock 0 308, which incorporates the PEBs in the PEB0 row across all dies. Alternately, a LEB may include PEBs from different rows, such as logical erase block/metablock N 310, which includes physical erase block n 316, physical erase block n 322, and other PEBs across the dies, including physical erase block n−1 326.

The physical erase blocks may be located in separate storage dies, shown as die 0 302, die 1 304, and die N 306. In certain embodiments, a die may be divided into planes. The physical erase blocks may be constructed using a two-tier memory architecture, and thus may be divided by a fabrication joint, such as the fabrication joint 370 that divides physical erase block 0 312, the fabrication joint 372 that divides physical erase block 0 318, and the fabrication joint 374 that divides physical erase block 0 324. The physical and logical pages on either side of a fabrication joint may be grouped into a sub-block, such as the sub-block 0 376 and sub-block 1 378 shown.

Those of skill in the art appreciate the relationship and differences between physical erase blocks and a logical erase blocks and may refer to one, or the other, or both by using the shorthand version erase block, block, or storage block. Those of skill in the art understand from the context of the reference to an erase block whether a physical erase block or a logical erase block (or metablock or superblock) is being referred to. The concepts and techniques used in the art and those recited in the claims can be equally applied to either physical erase blocks or logical erase blocks.

As used herein, a "physical" structure such as a physical page, physical word line, physical erase block, physical plane, physical memory die, or the like, refers to a single physical structure that a controller, manager, module, or other logic component of a system can control and/or communicate with at some level within one or more levels of physical abstraction in the organization of the device, system, or apparatus. Similarly, a "logical" structure such as a logical page, logical word line, logical erase block, logical plane, logical memory die, or the like, refers to a collection of two or more single physical structures of that same type that a controller, manager, module, or other logic component of the system can control and/or communicate with at some level within one or more levels of physical abstraction in the organization of the device, system, or apparatus. It should be noted that one or the other or both a "physical" structure and a "logical" structure may have distinct addresses that can be used to identify one "physical" structure or "logical" structure relative to other structures of a similar nature and type. "Physical page" refers to the smallest physical unit, or storage block, within a given memory die and/or plane, such as a memory die, that can be written to in a single operation.

In certain embodiments, a physical page comprises a word line that is a row in a memory array of storage cells.

A logical erase block such as logical erase block/metablock 0 308 is further divided into multiple logical pages (logical page 330, logical page 332, logical page 334, logical page 336, and logical page 338) that, in turn, include multiple physical pages, such as physical page 0 340, physical page 1 342, physical page 2 344, physical page n−1 346, physical page n 348, physical page 0 350, physical page 1 352, physical page 2 354, physical page n−1 356, physical page n 358, physical page 0 360, physical page 1 362, physical page 2 364, physical page n−1 366, and physical page n 368.

In one embodiment, a physical page represents the smallest storage block within a given die that can be written to at a given time. In one embodiment, a logical page is the smallest writable storage block supported by the storage controller. (In one embodiment, the storage controller may include a buffer configured to store up to one logical page of data; upon filling the buffer, the storage controller may write the contents of the buffer to a single logical page simultaneously.) In some instances, dividing a logical page across multiple dies may result in faster access times for a set of data when multiple dies are accessed in parallel. The logical page configurations may be mapped to any physical page on a die, or across a plurality of memory dies, just as with logical erase blocks.

In some embodiments, a storage controller (such as storage controller 104 illustrated in FIG. 1) may associate metadata, also referred to as media characteristics, with one or more of the storage blocks (logical erase blocks, physical erase blocks, logical pages, and/or physical pages, subblocks, etc.). "Metadata" refers to system data usable to facilitate operation of non-volatile storage device. Metadata stands in contrast to, for example, data produced by an application (i.e., "application data") or forms of data that would be considered by an operating system as "user data."

For example, a zone or a logical erase block may include metadata specifying, without limitation, usage statistics (e.g., the number of program erase cycles performed on that zone or logical erase block, health statistics (e.g., a value indicative of how often corrupted data has been read from that zone or logical erase block), security or access control parameters, sequence information (e.g., a sequence indicator), a persistent metadata flag (e.g., indicating inclusion in an atomic storage operation), a transaction identifier, or the like. In some embodiments, zone or logical erase block includes metadata identifying the logical addresses for which the zone or logical erase block stores data, as well as the respective numbers of stored data blocks/packets for each logical block or sector within a zone.

In certain embodiments, the metadata comprises a cross temperature for a zone, an average cross temperature for open zones of the non-volatile storage device, a temperature change rate, an average program erase count for a zone, an uncorrectable bit error rate (UBER) for a zone, a fail bit count for a zone, and a charge leak rate.

"Media characteristic" refers to an attribute or statistic for a set of particular storage cells, such as a program/erase cycle count for the set of storage cells, a read count for the set of storage cells, a retention time since a previous write for the set of storage cells (aka a data retention time), a dwell time for the set of storage cells such as a logical or physical erase block (e.g., a time between a program of an erase block and an erase of the erase block), an average of multiple previous dwell times for the set of storage cells, an error statistic for the set of storage cells, or the like.

A media characteristic for a set of storage cells may be substantially static or may be dynamic and change over time. A media characteristic, in one embodiment, is a statistic, heuristic, mathematical model, transform, or other descriptor associated with an attribute of the non-volatile memory media.

A media characteristic, in one embodiment, includes or relates to a make, a model, a manufacturer, a product version, or the like for the storage device and/or for the non-volatile memory media. A media characteristic, in a further embodiment, may include or relate to an environmental condition or a use of the storage device and/or of the non-volatile memory media, such as a temperature, a use case (e.g., a cache use case, an archival use case, a server use case, an enterprise use case, a consumer use case, etc.), or the like.

The storage controller may manage metadata that identifies logical addresses for which a logical erase block stores data, as well as the respective numbers of stored data packets for each logical erase block, data block, or sector within a logical address space. "Logical address space" refers to a logical representation of memory resources. The logical address space may comprise a plurality (e.g., range) of logical addresses. A storage controller may store metadata or media characteristic data in a variety of locations, including on non-volatile memory media, in volatile memory, in a structure stored with each logical erase block, or the like.

Figure 4:
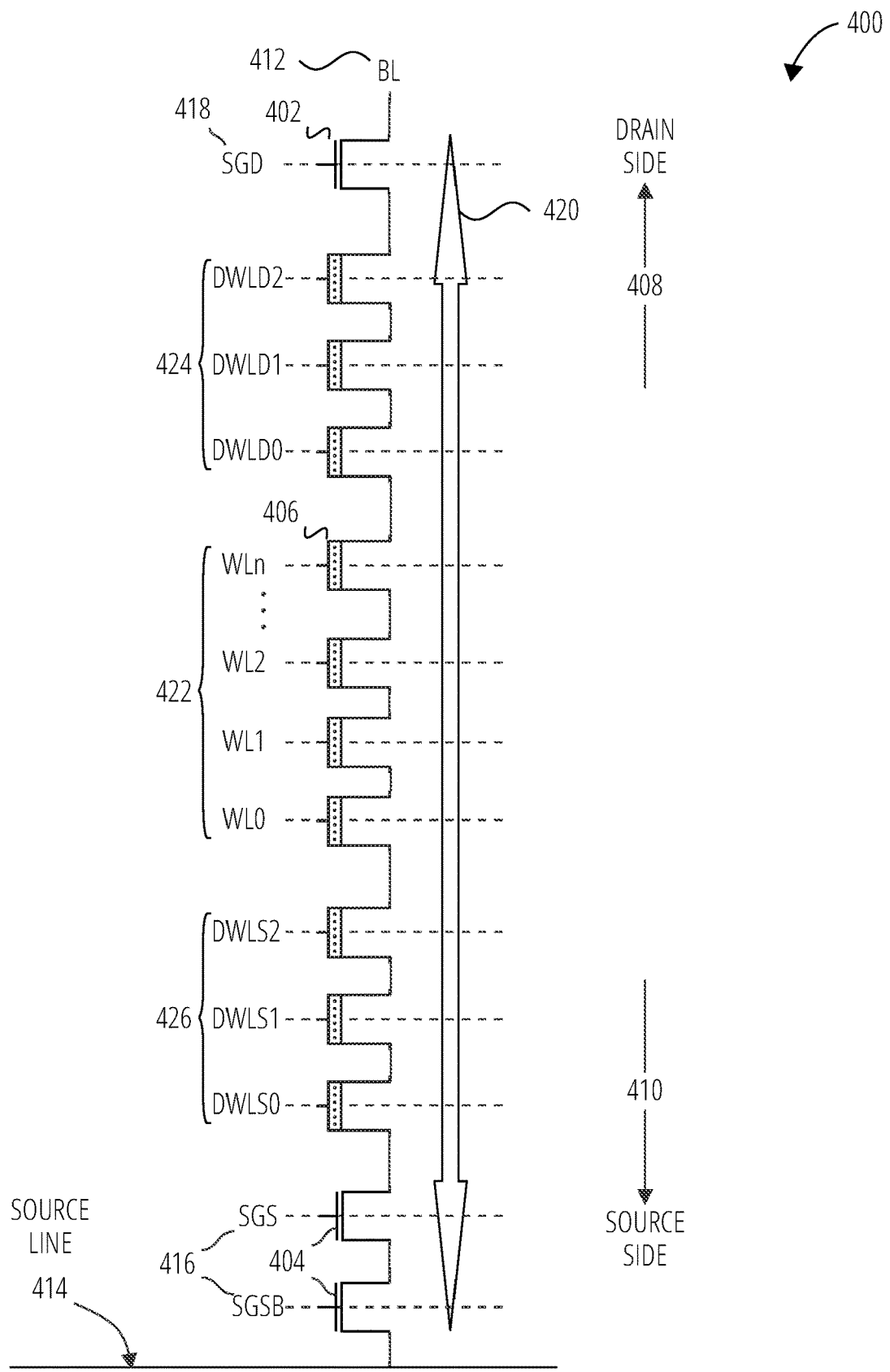
FIG. 4 is a schematic block diagram illustrating one embodiment of a NAND string 400.

FIG. 4 is a circuit diagram depicting a NAND string 400 comprising drain-side select gates 402, source-side select gates 404, and a series or set of memory cells 406 (e.g., n=4, 8, 16 or higher) daisy-chained by their source terminals and drain terminals. "NAND string" refers to circuitry that includes a plurality of memory cells. A NAND string includes a series of memory cells configured as transistor (e.g., n=4, 8, 16 or higher) daisy-chained by each memory cell's source electrodes and drain electrodes. At least one pair of select transistors (e.g. Select gates) connect the memory transistor chain, the NAND string, to a bias source by way of the NAND string's drain electrode and to a ground source by way of the NAND string's source electrode.

While 10 memory cells are illustrated in NAND string 400 for simplicity, some NAND strings may include any number of memory cells (e.g., thirty-two, sixty-four, or more). The memory cells 406 may be chained from the drain side 408 to the source side 410. On the drain side 408, the NAND string 400 may connect to a bit line 412. On the source side 410, the NAND string 400 may connect to a source line 414. An architecture for a memory array using a NAND structure may include a significant number of NAND strings.

One or more drain side select transistors (drain-side select gate 402) connect the memory transistor chains to a bias by way of the NAND string's drain terminal and to a ground source by way of a source terminal.

In a memory array, when the source-side select gates 404 are turned on, the source terminal is coupled to a source line 414. Similarly, when the source-side select gates 404 are turned on, the drain terminal of the NAND string is coupled to a bit line 412 of the memory array. Source control lines 416 (SGS and SGSB) may be used to control the source-side select gates 404 (transistors). The NAND string 400, in one embodiment, is connected to its bit line 412 by drain-side select gates 402 as shown. The drain-side select gates 402 may be controlled by a drain control line 418 (SGD). In some embodiments, the source control lines 416 and drain control line 418 (referred to collectively as control lines)

may not necessarily be configured in common among the NAND strings; that is, different control lines may be provided for different NAND strings.

The memory cells 406 may be transistors that incorporate a control gate and a charge trap layer. The control gate of each memory transistor may allow control over read and write operations. The charge trap layer may comprise a charge storage element to store a given amount of charge so as to represent an intended memory state. "Memory state" refers to a condition of a memory cell designed and/or configured to represent an encoding for one or more data bit values. In certain embodiments, the memory state may be changed by using a storage operation. In a non-volatile memory cell, the memory cell maintains its memory state without a power source. The control gates of corresponding memory transistors of a row of memory array (one from each NAND string) are all connected to the same word line. Similarly, a control gate of each of the select transistors provides controlled access to the NAND string via its source terminal and drain terminal respectively.

When an addressed memory cell (e.g., memory cell 406) within a NAND string is read or is verified during programming, its control gate is supplied with an appropriate voltage, also referred to as a reference voltage or read voltage. "Read voltage" refers to a voltage level configured to test, or check, which memory cells conduct at the voltage level. In certain embodiments, the memory cells may comprise transistors and the read voltage is a voltage level at, or above the threshold voltage for the memory cells which causes the memory cell to conduct a current.

In certain embodiments, depending on the type of encoding used to store data on the memory cell and the number of bits encoded on each memory cell, a single read/sense operation using a single read voltage may be determinative of the memory state of the memory cell. In other embodiments, a number of read/sense operations each performed at different read voltage levels may be used to determine the memory state of the memory cell. The determined memory state may then be decoded into a representation of the data bits stored by the memory cell. "Read voltage" is a shorthand reference to a "read threshold voltage." "Read level" is another term commonly used to describe a "read voltage" and the two terms are used interchangeably herein.

At the same time, the rest of the non-addressed memory cells in the NAND string 400 are fully turned on by application of sufficient voltage (also referred to as a pass voltage) on their control gates. In this way, a conductive path is effectively created from the source of the individual memory cell to the source terminal (e.g., source line 414) of the NAND string 400 and likewise for the drain of the individual memory cell to the drain terminal (e.g., bit line 412) of the memory cell. This conductive path may travel through one or more structures of a NAND string and is referred to herein as channel 420. On the physical memory die, a channel 420 extends from the source side 410 to the drain side 408 of the NAND string 400.

"Pass voltage" refers to a voltage level configured to activate (cause to conduct) memory cells regardless of the memory state stored/retained on the memory cell. A pass voltage is set to a high enough voltage that memory cells having a high threshold voltage (e.g., greater than 6 volts) will activate/conduct when the pass voltage is supplied to a gate of the memory cell implemented as a transistor.

In certain embodiments, the purpose of a pass voltage, is to create a conduction path between a sense amplifier connected to a bit line at one end of a NAND string (also referred to a as a channel) that includes the memory cell and a source line connected at the other end of the NAND string. The conduction path may be desired so that a memory cell along the NAND string coupled to a selected word line can be read, sensed, or programmed. In one embodiment, a pass voltage is provided to unselected word lines so that a storage operation can be performed on memory cells of a selected word line. In certain embodiments, a pass voltage is not used to read a memory state of a memory cell.

As illustrated, each of the word lines 422 WL0-WLn, where WLn is the word line closest to the drain-side select gates 402, comprises one or more memory cells 406. Each bit line 412 and respective NAND string 400 in a memory array may comprise the columns of the NAND string 400, storage block, erase block, or the like. These columns may also be referred to as channels. The word lines 422 WL0-WLn, in some embodiments, comprise the rows of the NAND string 400, storage block, erase block, or the like. Each word line WL0-WLn, in some embodiments, connects the control gates of each memory cell 406 in a row. Alternatively, the control gates may be provided by the word lines 422 WL0-WLn themselves. In some embodiments, a word line may include tens, hundreds, thousands, millions, or the like of memory cells 406. In certain embodiments, the word lines 422 WL0-WLn may include a fabrication joint, such as fabrication joint 370 positioned midway between word lines 422 WL0-WLn.

In a memory array, word lines may be organized or architected to facilitate use in a sequential order so that the memory array is used efficiently. "Sequential order" refers to a set of steps, operations, sub-steps, or events that are arranged to be done in a certain sequence.

The same, or different sequences, may be used for any of the storage operations. For example, in one embodiment, the word lines of a memory array may be programmed in sequential order, starting from a word line closest to a source line and progressing sequentially with each adjacent unprogrammed word line toward a word line closest to a select gate drain and/or bit line. In another example, in one embodiment, the word lines of a memory array may be programmed in sequential order starting from a word line closest to a select gate drain and/or bit line and progressing sequentially with each adjacent unprogrammed word line toward a word line closest to a source line and/or source select gate. In still other examples, a sequence for choosing which word line to program after a last programmed word line may follow a pattern other than sequential.

In a memory array, a coupling effect may cause undesirable effects to various structures and/or circuit components of the memory array, including memory cells, NAND string channels, select gates, and the like. "Coupling effect" refers to a change in bias, electric potential, voltage, and/or electromagnetic field between two circuits, portions of circuits, circuitry, or other electronic components, including semiconductors. Thus, a coupling effect may be referred to herein as a type of disturb, at least in part, because of these undesired effects. A coupling effect, depending on when and/or how the effect occurs, may also be referred to as a programming disturb, a program disturb, or a read disturb. "Program disturb" refers to a type of electronic interference and/or magnetic interference created during, or after, or as a result of, a programming storage operation and/or a stage of a programming storage operation.

A coupling effect may impact select gates used to manage a bias level within channels of NAND strings. For example, a bias on one or more control lines coupled to the select gates may introduce a sufficiently strong potential on a voltage level within in a channel that the voltage of the channel couples up (or down, depending on the sign of the bias) because of the influence of the electromagnetic field created by the signal in the control lines.

In this manner, the apparatus claimed herein may comprise a die controller that is configured to program word lines of the three-dimensional memory array by programming each word line in a sequence progressing from the plurality of drain side dummy word lines 424 toward the source side dummy word lines 426. "Dummy word line" refers to a structure within a memory array configured like a word line that stores data in memory cell, however a dummy word line is not regularly used to store data and instead is positioned, controlled, and managed within the memory array to compensate for, mitigate, or buffer against electrical interference, or disturbs from electrical circuitry positioned around the dummy word line. In one embodiment, a dummy word line includes a set of memory cells positioned at an intersection of a dummy word line and a NAND string, each memory cell coupled to the dummy word line by a dummy word line select gate. A control signal sent on the dummy word line may have a voltage at, or above, a threshold voltage for the dummy word line select gates such that the dummy word line select gate as activated which may enable a bias or current to pass within the channel of the NAND string and between a source terminal and a drain terminal of the memory cell. In this manner, the dummy word line may serve as a control line.

In one embodiment, each memory cell is configured to store data. For example, when storing one bit of digital data, the range of possible threshold voltages ("Vt") of each memory cell may be divided into two ranges which are assigned logical data "1" and "0." As used herein, threshold voltage refers to a magnitude of voltage applied to the gate of a memory cell sufficient to cause the memory cell to activate. In embodiments, in which the memory cell is a NAND transistor, the threshold voltage is a sufficient voltage applied to a gate terminal of the transistor that causes the transistor to conduct current between its source terminal and drain terminal. In one example of a NAND type flash memory, the Vt may be negative after the memory cells are erased and defined as logic "1." In one embodiment, the Vt after a program operation is positive and defined as logic "0."

When the Vt is negative and a read is attempted, in some embodiments, memory cells will turn on to indicate logic "1" is being stored. When the Vt is positive and a read operation is attempted, in a further embodiment, a memory cell will not turn on, which indicates that logic "0" is stored. Each memory cell may also store multiple levels of information, for example, multiple bits of digital data. In such an embodiment, the range of Vt value is divided into the number of levels of data. For example, if four levels of information can be stored in each memory cell, there will be four Vt ranges assigned to the data values "11", "10", "01", and "00."

In one example of a NAND type memory, the Vt after an erase operation may be negative and defined as "11." Positive Vt values may be used for the states of "10", "01", and "00." In one embodiment, the specific relationship between the data programmed into the memory cells and the threshold voltage ranges of the memory cells depends upon the data encoding scheme adopted for the memory cells.

Figure 5:
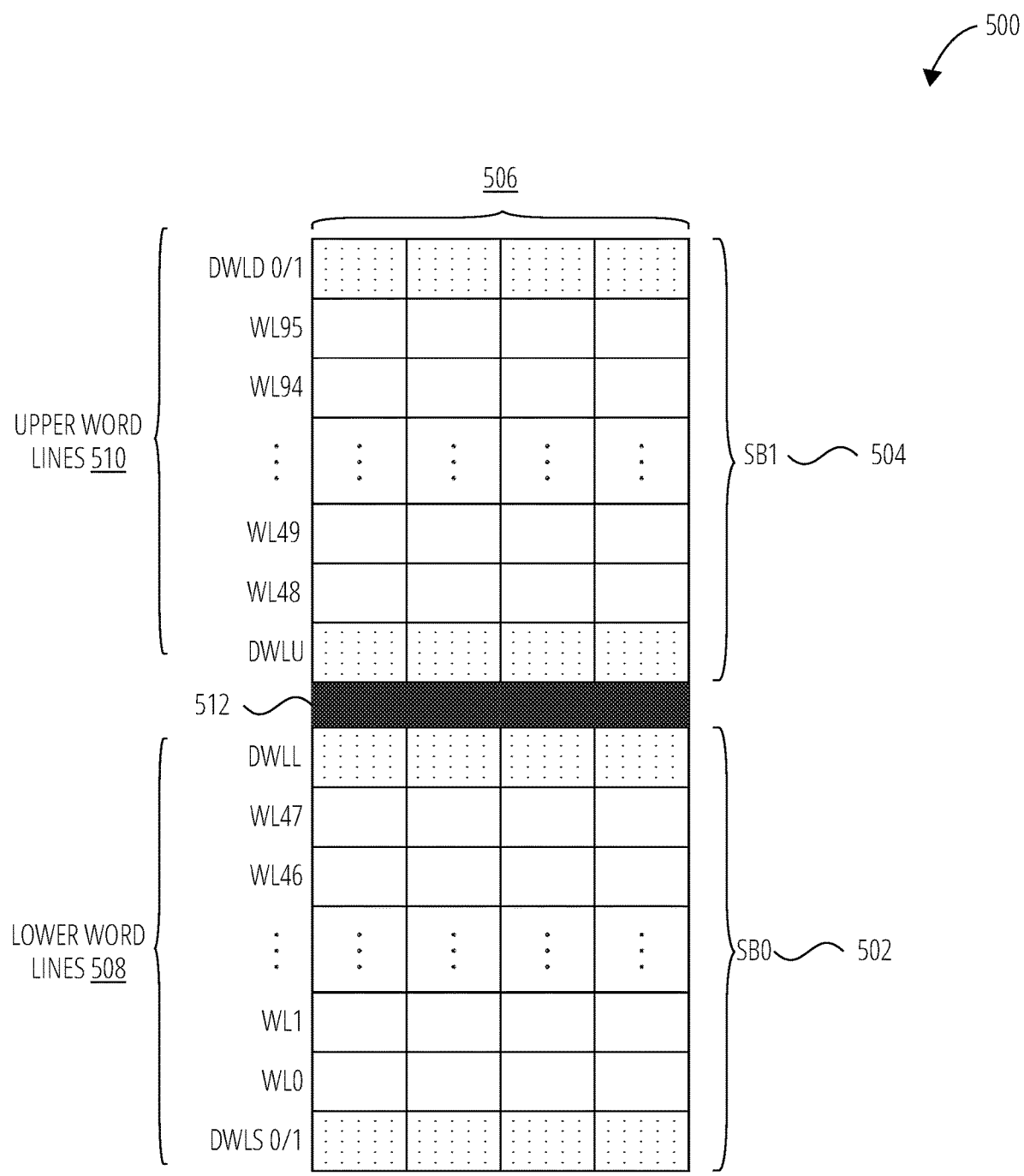
FIG. 5 illustrates a memory array 500 in accordance with one embodiment.

FIG. 5 illustrates a memory array 500 with sub-block 0 502 and sub-block 1 504 in accordance with one embodiment. The memory array 500 may comprise multiple NAND string sets 506. The NAND string sets 506 may be comprise a grouping of NAND strings that extend into the page for a three-dimensional memory array. Each NAND string of the NAND string sets 506 may implement multiple word lines and dummy word lines, such as the lower word lines 508 and upper word lines 510 arranged on either side of a fabrication joint 512.

When used in sub-block mode, a memory array structure such as that illustrated here may be divided into two sister sub-blocks on either side of the fabrication joint 512, such as sub-block 0 502 and sub-block 1 504 as shown. In other memory architectures, more than two sister sub-blocks may be implemented, depending on the structure and capabilities of the memory die used.

"Sister sub-block" refers to one of two or more sub-blocks that are within the same physical erase block. In certain embodiments, a sub-block and its sister sub-block together may be structurally no different than a single physical erase block that includes them. In such embodiments, a die controller may perform independent storage operations on each sister sub-block by way of how the die controller manages control lines coupled to the physical erase block that includes the sister sub-blocks. In certain embodiments, a die controller may manage control lines coupled to the physical erase block that includes the sister sub-blocks by way of configuration settings defined for the physical erase block.

"Configuration setting" refers to a parameter of a set of storage cells that is modifiable by way of an interface. Examples of a configuration setting include, but are not limited to, a read threshold or read level, a write or program threshold, an erase threshold, a number of programming pulse iterations to use for programming, a step setting between programming pulses, a program pulse duration, a pass voltage level, a select gate voltage level, an erase voltage level, an erase pulse duration, an erase operation methodology, whether a storage cell stores one bit or more than one bit, or the like. In certain embodiments, the configuration settings may be referred to as "trim" parameters. These trim parameters may include settings and adjustments made by a storage controller to account for differences in sets of storage cells due to Process variations, Voltage level differences, and Temperature differences (PVT).

In certain embodiments, configuration settings includes voltage levels and timing settings for one or more source select gates, drain select gates, unselected word lines, a selected word line, a source line, a bit line, and the like, for one or more control lines of a non-volatile memory array of storage cells.

An interface for modifying a configuration setting may include a programmable data register, a memory location, a command interface of a control bus for the non-volatile memory array, an API of a device driver of the storage device, a control parameter for the storage controller, or the like.

In certain embodiments, the configuration settings for a memory array 500 is set before operating sub-block 0 502 independent of sub-block 1 504. Alternatively, the configuration settings may be set to treat sub-block 0 502 and sub-block 1 504 as a single physical erase block or logical erase block. In certain embodiments, the memory array 500 may include one or two dummy word lines on either side of the data word line, such as DWLS 0 and DWLS1 on the source side, DWLD 0 and DWLD1 on the drain side, DWLL a dummy word line on the lower side of the fabrication joint 512, and DWLU a dummy word line on the upper side of the fabrication joint 512.

Figure 6:
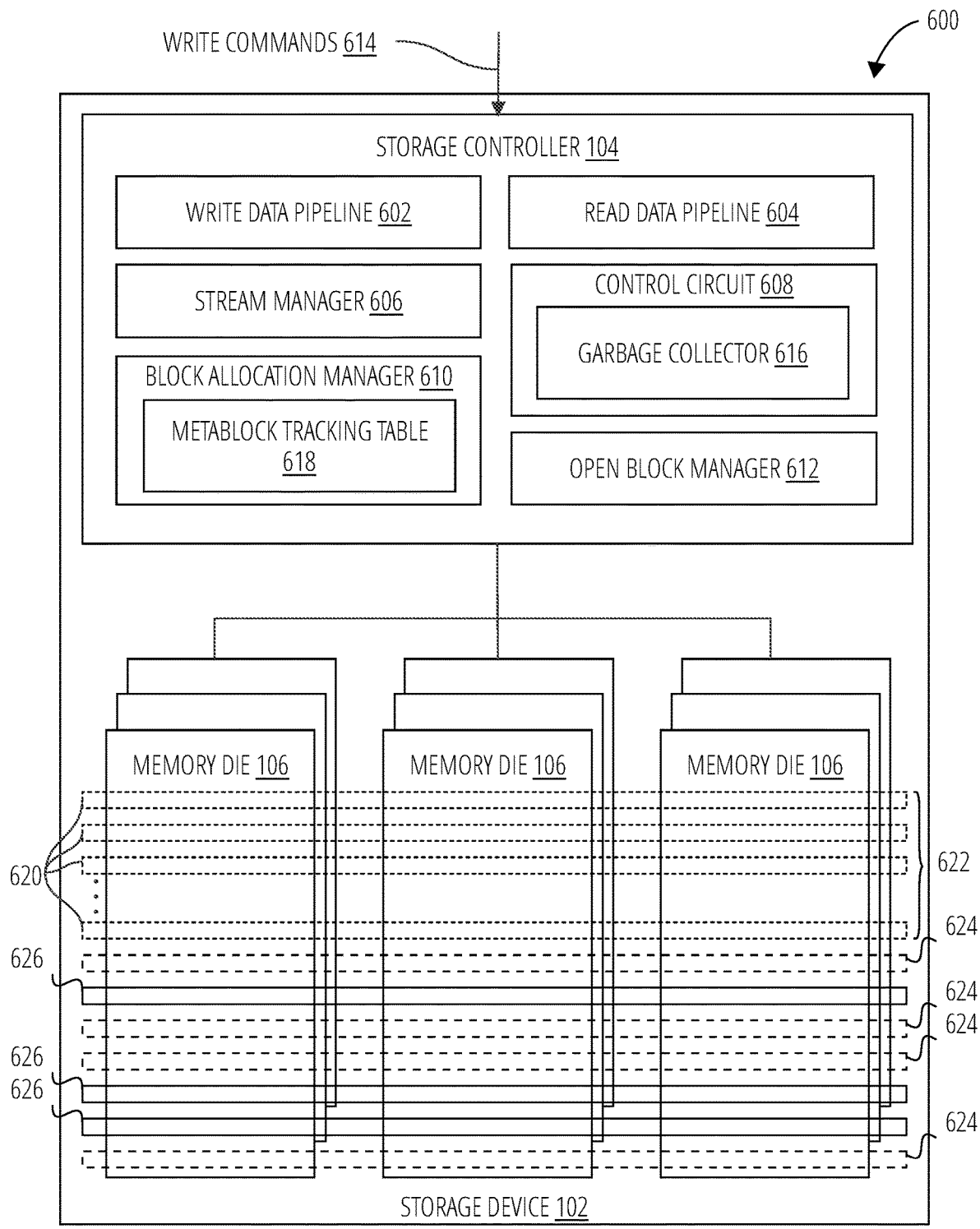
FIG. 6 illustrates a system 600 in accordance with one embodiment.

FIG. 6 illustrates a system 600 in accordance with one embodiment. This system comprises the functionality for the solution disclosed herein, including a storage device 102, a storage controller 104, and a set of memory dies 106. The storage controller 104 may comprise a write data pipeline 602, a read data pipeline 604, a stream manager 606, a control circuit 608, a block allocation manager 610, and an open block manager 612.

The storage device 102, storage controller 104, and memory die 106 may function effectively as previously described. The memory dies 106 may be arranged in an array having at least one row and at least two columns. In order to implement the disclosed solution, the storage controller 104 may accept write commands 614 from a host, and process those write commands in the manner disclosed herein through implementation of the logic described in detail. The memory dies 106 may be portioned into sets of logical erase blocks, each comprising a physical erase block from each memory die of a row of the non-volatile memory array. Each physical erase block that forms a logical erase block may comprise two sister sub-blocks, as illustrated in FIG. 5.

The storage controller 104 may include a write data pipeline 602 to receive write commands 614 and write data (both system and user) to the solid-state storage (e.g., storage device 102) and a read data pipeline 604 to retrieve data (system and/or user) stored on the solid-state storage (e.g., storage device 102). The write data pipeline 602 may include a packetizer that receives data (also referred to as a data segment) to be written to the solid-sate storage and creates one or more data packets sized for the solid-state storage. Each data packet may include a header and data from the data segment. The write data pipeline 602 may include an ECC generator that generates one or more ECC code words for one or more data packets received from the packetizer prior to writing the data packets to the solid-state storage. The write data pipeline 602 may in the disclosed solution receive write commands 614 which include logical block addresses and may be configured to write the data of the write command 614 into one set of logical erase blocks in sub-block mode.

The read data pipeline 604 may include an ECC decoder that converts one or more ECC code words retrieved from the solid-state storage into one or more data packets and corrects and/or identifies errors in the data that is decoded. The read data pipeline 604 may include a depacketizer that receives decoded data (which also may be error corrected) from the ECC decoder and converts the one or more data packets into data (user or system) that may be used to service a read command.

The stream manager 606 tracks, or monitors, write commands 614 received by the storage device 102 in order to determine information about the workloads that the storage device 102 is handling. "Stream" refers to a set of input/output (I/O) storage commands, and associated data, that has a common workload attribute. For example, where the workload attribute is that the IO storage commands are for a sequential workload type, the stream associated with the sequential workload type may be referred to as a sequential stream. Where the workload attribute is that the IO storage commands are for a random workload type, the stream associated with the random workload type may be referred to as a random stream.

"Workload attribute" refers to any quality, characteristic, attribute, feature, behavior, trait, or property about a workload. A workload attribute may be explicitly identified and defined, for example by a storage client. Alternatively, a workload attribute may be implied and may be derived based on other information. Examples of workload attributes include, but are not limited to, update/access frequency, whether or not the data accessed in the storage command is accessed according to sequential ascending, sequential descending, or randomly identified LBAs, LBA reference clustering, or other similar attributes.

"Workload type" refers to a designation for a type of storage commands a storage controller is receiving from a host. Various workload types may exist based on various metrics includes quality of service and ordering of the logical block addresses received in a sequence of ordered storage commands. Examples of workload type include sequential workload type and random workload type.

The storage device 102 may handle other storage commands in addition to write commands 614. Storage commands as used herein comprise read commands, write commands, maintenance commands, diagnostic commands, test mode commands, and any other command a storage controller 104 may receive. A "workload" as used herein is the number and type of write command 614 received and/or serviced by the storage device 102 and the outcome or results from servicing those write command 614. Workload may also include any statistics about the write command 614. In one embodiment, the stream manager 606 maintains statistics about the write commands 614 including, but not limited to, how many write commands have been received over a particular time period, how many write commands succeeded, how many write commands failed, and the like.

As the stream manager 606 monitors write commands 614 (along with other storage commands, also referred to as input IO transactions), the stream manager 606 tracks one or more workload attributes that define, describe, or characterize the workloads. As used herein, a "workload attribute" is any quality, characteristic, attribute, feature, behavior, trait, or property about a workload. A workload attribute may be explicitly identified and defined, for example by a storage client. Alternatively, a workload attribute may be implied and may be derived based on other information.

In one embodiment, the stream manager 606 reviews or analyzes one or more workload attributes and determines patterns, similarities, relationships, and/or commonalities between storage commands that are based on the workload attributes. In certain embodiments, these patterns, similarities, relationships, and/or commonalities are referred to as hints and can be used to improve the performance of the storage device 102. In certain embodiments, the stream manager 606 determines, or derives, a relationship between storage commands. A relationship is any connection or association between the workload attributes of a first set of storage commands in relation to a second set of storage commands. In certain embodiments, the relationship is explicit and determined based on a review of the workload attributes. In other embodiments, the relationship is implicit and is derived based on a review of the workload attributes.

The stream manager 606 in the system of this disclosure may determine a workload type attribute for a set of write commands 614. To do so, the stream manager 606 may monitor the write commands 614 as they are received in sequence from the host. The stream manager 606 may then compare the logical block addresses of the incoming write commands 614 with logical block addresses of prior write commands 614. A sequential workload type may be determined when logical block addresses of sequential write commands 614 are in sequential order as they arrive. "Sequential workload type" refers to a set of logical block addresses (LBAs) for storage commands received such that each storage command received references a next LBA in a sequential order.

The control circuit 608 of the storage controller 104 may include a garbage collector 616. Each logical erase block of the memory die 106 may be configured to store data in sub-block mode, and may therefore comprise at least two sister sub-blocks. The garbage collector 616 may consolidate valid data from one sister sub-block and move the valid data to another storage block. During a garbage collection operation on one sister sub-block, the data in a corresponding sister sub-block may remain in the corresponding sister sub-block and may be unaffected.

The block allocation manager 610 coordinates with the stream manager 606 and open block manager 612 to determine a physical location for write data on the memory die 106. "Block allocation manager" refers to any hardware, software, firmware, circuit, component, module, logic, device, or apparatus configured, programmed, designed, arranged, or engineered to determine where to store data within a non-volatile storage device. In certain embodiments, the block allocation manager determines which storage block to use for incoming write data.

The block allocation manager 610 may reconfigure one of a set of logical erase blocks for storage operation in full-block mode. To do this, the block allocation manager 610 may send a configuration command such as a full-block mode command to the memory dies 106 that include the logical erase block. "Configuration command" refers to a type of storage command that directs a storage device, storage controller, die controller, or the like to change one or more configuration settings. "Full-block mode command" refers to a type of configuration command that causes a die controller to operate a storage block as a full logical erase block in which the logical erase block is made up of two or more physical erase blocks from two or more memory planes, and/or memory die. A full-block mode command is an opposite command from a sub-block mode command which is a type of configuration command that causes a die controller to operate a storage block as a set of sub-blocks that together span two or more memory planes, and/or memory die. The sub-blocks that form each storage block are a logical division of a physical erase block.

The block allocation manager 610 may direct write commands 614 having sequential workload type to the reconfigured logical erase block. The block allocation manager 610 may instruct the write data pipeline 602 to write data to the reconfigured logical erase block in full-block mode. Operating the logical erase block in full-block mode means that both sister sub-blocks of each memory die of the logical erase block are used as a single physical erase block. The block allocation manager 610 may direct the write data pipeline 602 to write data to the logical erase block in full-block mode until write commands having a random workload type are determined/detected by the stream manager 606. "Random workload type" refers to a set of logical block addresses (LBAs) for storage commands received such that each storage command received references a next LBA in a random order, pseudo-random order, or order other than a sequential order.

When a random workload type is determined, the configuration settings for the two or more memory die of the target storage block may be changed from full-block mode configuration settings to sub-block mod sub-block mode configuration settings. It should be noted that changing configuration settings is an operation that affects all storage blocks of a memory die. With the disclosed solution certain storage blocks may be configured and used in full-block mode, while others, on the same memory die may be configured and used in sub-block mode.

"Target storage block" refers to a set of one or two metablocks selected, chosen, designated, or identified for use in writing data. In one embodiment, a target storage block comprises a single metablock made up of sub-blocks from two or more planes and/or memory die of a memory array. In another embodiment, a target storage block comprises two metablocks made up of sister sub-blocks of a single physical erase block from two or more planes and/or memory die of a memory array. In still another embodiment, a target storage block comprises either a single metablock or two metablocks (a pair of metablocks) that spans two or more planes and/or memory die of a memory array. Thus, depending on how a target storage block is used, full-block mode or sub-block mode, the target storage block comprises either a single sister sub-block from each memory die of the memory array or a pair of adjacent sister sub-blocks from each memory die of the memory array.

"Full-block mode configuration setting" refers to configuration settings configured, designed, adjusted, and/or set to enable storage operations on an erase block (both a physical erase block and/or a logical erase block) to use the erase block as a full-block, one having/including no sub-blocks. "Sub-block mode configuration setting" refers to configuration settings configured, designed, and/or set to enable storage operations on a sub-block of an erase block (both a physical erase block and/or a logical erase block).

To implement the disclosed solution, the block allocation manager 610 may incorporate a metablock tracking table 618, described in further detail with regard to FIG. 9. The metablock tracking table 618 may be used to register a target storage block for incoming write data based on the workload type determined by the stream manager 606. When the stream manager 606 determines that the workload is of a sequential workload type, the block allocation manager 610 may select a free metablock 620 from the free metablock pool 622 for use as the target storage block. "Free metablock" refers to a metablock that is not being used to store valid data and is available for use to store data of current or future write commands. "Free metablock pool" refers to a set of free metablocks identified, prepared, and/or designated for use by a storage controller.

Configuration settings for the memory dies 106 of the target storage block may be set to indicate that those portions of the memory dies 106 will operate in full-block mode. In one embodiment, the default configuration settings may indicate that memory dies 106 are to be operated in sub-block mode, and these settings may be updated when full blocks are needed. The target storage block may be erased in full-block mode to prepare it to receive data, then registered in the metablock tracking table 618 as a full storage block. "Full storage block" refers to a pair of metablocks configured to be programmed and/or erased as a single unit. In one embodiment, a full storage block comprises two metablocks made up of sister sub-blocks of a single physical erase block from two or more planes and/or memory die of a memory array. Registering the target storage block in the metablock tracking table 618 may include updating the metablock tracking table 618 to identify the target storage block as a full storage block and managing the target storage block as a full storage block until the target storage block is erased subsequent to receiving data for the set of write commands. In one embodiment, the block allocation manager 610 directs the open block manager 612 where to store write data within the current open erase blocks.

The open block manager 612 manages which metablocks spanning the memory dies 106 are open metablocks 624, which are closed metablocks 626, and which are free metablocks 620. "Open metablock" refers to a metablock that is configured to receive data block for one or more write commands. Typically, an open metablock includes storage space for one or more additional data blocks. In certain embodiments, an open metablock may be associated with a particular set of data, such as a stream.

The open block manager 612 keeps track of the physical address within each memory die 106 where a subsequent page (physical or logical) can be written to that particular open metablock 624 and advances a pointer tracking this physical address as data is written to open metablocks 624. The open block manager 612 determines when the open metablocks 624 are about to become full, closes open metablocks 624 to form closed metablocks 626, converts free metablocks 620 into open metablocks 624, and coordinates with other components of the storage controller 104 to ensure that sufficient free metablocks 620 are available. The open block manager 612 may be further configured to manage a reconfigured logical erase block in full-block mode.

Figure 7:
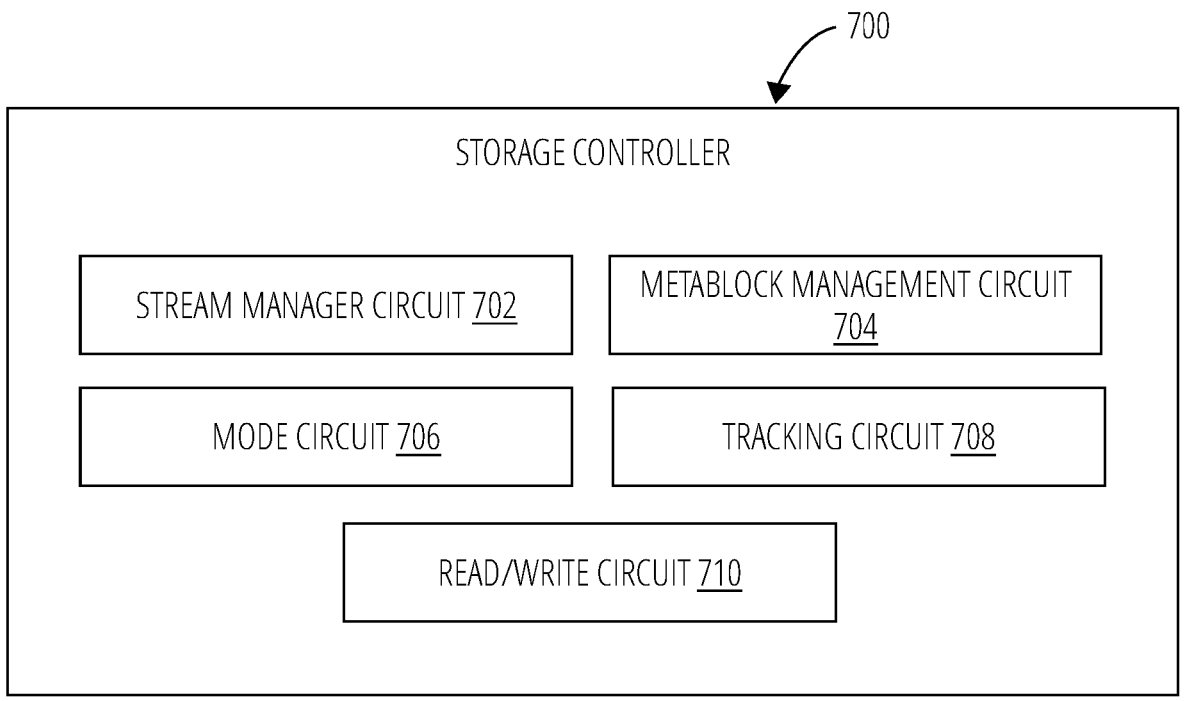
FIG. 7 illustrates a storage controller 700 in accordance with one embodiment.

FIG. 7 illustrates a storage controller 700 in accordance with one embodiment. The storage controller 700 comprises a stream manager circuit 702, a metablock management circuit 704, a mode circuit 706, a tracking circuit 708, and a read/write circuit 710.

The stream manager circuit 702 may be configured to monitor write commands. The stream manager circuit 702 may thereby determine that a set of write commands it monitors correlate to a sequential workload type. In one embodiment, the stream manager circuit 702 may be further configured to determine that write commands correlate to a random workload type rather than a sequential workload type.

The metablock management circuit 704 may be configured to designate a free metablock to receive data for a set of write commands. The metablock management circuit 704 may be further configured to erase the free metablock, so designated, in full-block mode. Erasing a free metablock in full-block mode means that both sister sub-blocks of the free metablock are erased in a single erase operation. This erase operation is twice as fast as erasing each sister sub-block of the free metablock separately, for example, where the free metablock is used in sub-block mode. The metablock management circuit 704 may also be configured to designate a second free metablock to receive data for a second set of write commands. The metablock management circuit 704 may then erase the second free metablock in sub-block mode. The free metablocks may comprise sub-portions of a plurality of memory dies.

The memory dies may be coupled in parallel to an interface bus, as illustrated in FIG. 1. The mode circuit 706 may send a full-block mode command or a sub-block mode command to the memory dies that include portions of the free metablock. "Sub-block mode command" refers to a type of configuration command that causes a die controller to operate a storage block as a set of sub-blocks that together span two or more memory planes, and/or memory die. The sub-blocks that form each storage block are a logical division of a physical erase block. A sub-block mode command is an opposite command from a full-block mode command which is a type of configuration command that causes a die controller to operate a storage block as a full logical erase block in which the logical erase block is made up of two or more physical erase blocks from two or more memory planes, and/or memory die.

The sub-block mode command may be configured to change the memory die configuration settings from full-block mode to sub-block mode settings. The full-block mode command may be configured to change memory die settings from sub-block mode or some other default mode. In some embodiments, sub-block mode may be the default mode for all or some of the plurality of memory dies. In one embodiment, the mode circuit 706 may issue a full-block mode command or a sub-block mode command exclusively in response to a change in workload type for subsequent sets of monitored write commands.

The tracking circuit 708 may associate a free metablock with a pair of sister sub-blocks on each of the memory dies configured to include a portion of the free metablock. The first and second free metablocks may each be associated with a first pair of sister sub-blocks and a second pair of sister sub-blocks, respectively. Each pair of sister sub-blocks may be associated with a specific physical erase block, as illustrated in FIG. 3 and FIG. 5.

The read/write circuit 710 may be configured to write data to the free metablock in full-block mode when a set of write commands is received correlating to the sequential workload type. The read/write circuit 710 may write data to a second free metablock in sub-block mode in response to a second set of write commands correlating to the random workload type.

Figure 8:
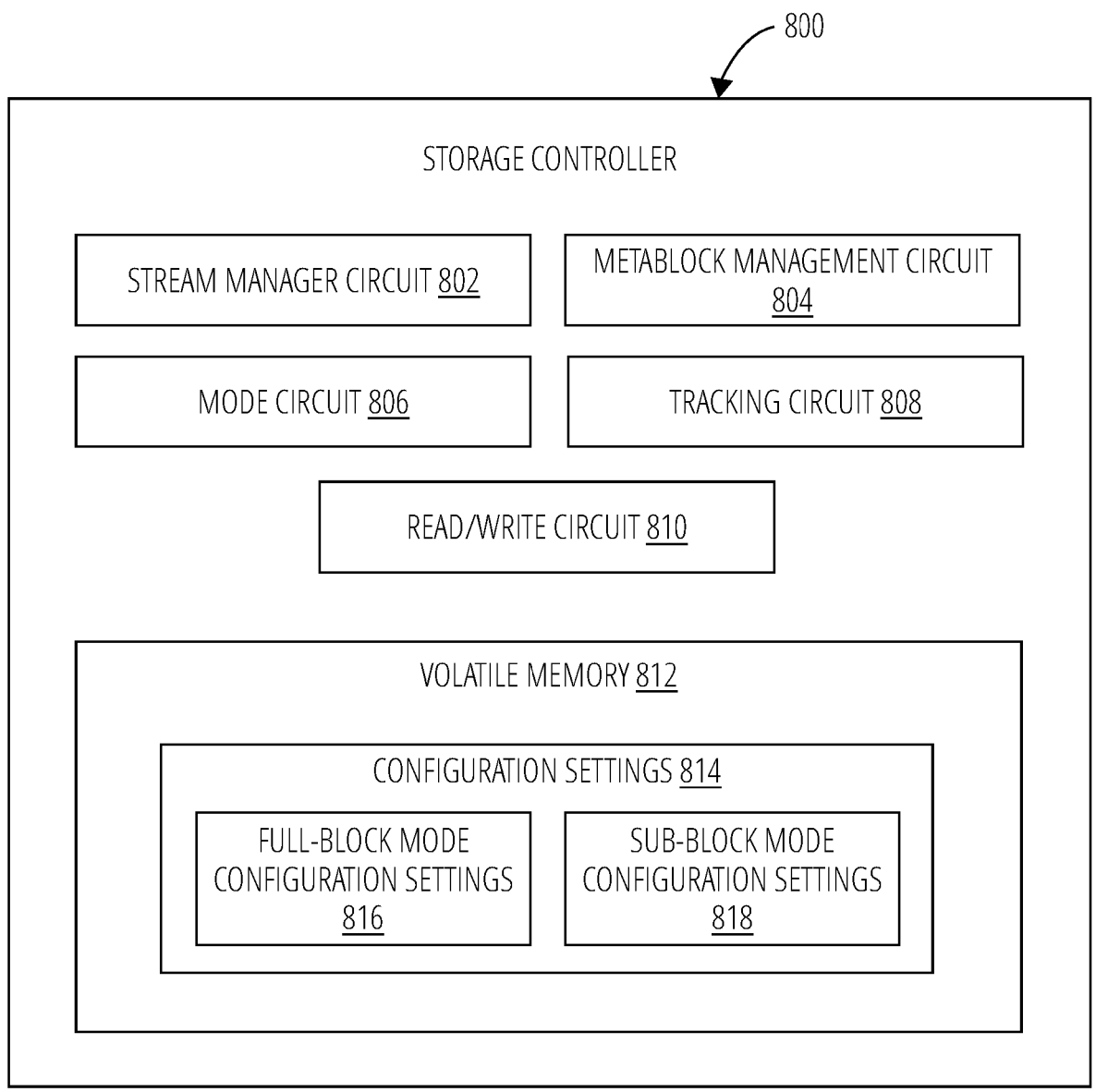
FIG. 8 illustrates a storage controller 800 in accordance with one embodiment.

FIG. 8 illustrates a storage controller 800 in accordance with one embodiment. The storage controller 800 comprises a stream manager circuit 802, a metablock management circuit 804, a mode circuit 806, a tracking circuit 808, a read/write circuit 810, and a volatile memory 812. The stream manager circuit 802, metablock management circuit 804, mode circuit 806, tracking circuit 808, and read/write circuit 810 may operate in a similar manner to the analogous elements of the storage controller 700 illustrated in FIG. 7. "Volatile memory" refers to a shorthand name for volatile memory media. In certain embodiments, volatile memory refers to the volatile memory media and the logic, controllers, processor(s), state machine(s), and/or other periphery circuits that manage the volatile memory media and provide access to the volatile memory media.

The volatile memory 812 may store configuration settings 814, including full-block mode configuration settings 816 and sub-block mode configuration settings 818. The configuration settings 814 may be sent to the memory dies to change the configuration settings.

Alternatively, or in another embodiment, a plurality of memory dies (not illustrated) may store full-block mode configuration settings 816 and sub-block mode configuration settings 818 within the volatile memory 812 on a die controller, such as the die controller 204 illustrated in FIG. 2. A full-block mode command issued by the mode circuit 806 may be configured to cause the die controller of each memory die of the plurality of memory dies to exchange that die's sub-block mode configuration settings for the full-block mode configuration settings. A sub-block mode command may be configured to perform the opposite operation upon the memory dies involved. With configuration settings 814 stored in volatile memory of a die controller, the change from sub-block mode configuration settings 818 to full-block mode configuration settings 816 can be made quickly.

FIG. 9 illustrates a metablock tracking table 900 in accordance with one embodiment. "Metablock tracking table" refers to a data structure used to maintain metadata about metablocks. Examples of metadata in a metablock tracking table include a number of program and erase operations for the metablock, whether the metablock is to be used in sub-block mode or full-block mode, whether the metablock is a free metablock or an unavailable metablock, a write temperature for the data of the metablock, and the like.

The metablock tracking table 900 may be implemented in addition to a conventional address mapping table. "Address mapping table" refers to a data structure that associates logical block addresses with physical addresses of data stored on a non-volatile memory array. The table may be implemented as an index, a map, a b-tree, a content addressable memory (CAM), a binary tree, and/or a hash table, and the like. The address mapping table may be referred to interchangeably as a Group Allocation Table (GAT).

The metablock tracking table 900 may incorporate information about which metablocks or logical erase blocks are comprised of which portions of physical memory dies, what mode the metablocks/logical erase blocks may be operated in, and which metablocks/logical erase blocks are available. In the metablock tracking table 900 illustrated, "MB" followed by a number may be used to designate a particular metablock or storage block or logical erase block. The column labeled "Block Mode" indicates what mode a metablock is being used in. A "1" in this column indicates that the metablock is being used in full-block mode (FBM). A "0" in this column indicates that the metablock is being used in sub-block mode (SBM). Certain other metadata that may be stored in the metablock tracking table 900 such as a temperature when data was last written to a metablock (Write Temp 902), a number of times the metablock has been programmed and erased (PE count 904), and the like.

A block allocation manager within the storage controller may reference the metablock tracking table 900 to determine which of a set of logical erase blocks/metablocks/storage blocks are available logical erase block/available metablock 906, such as those marked "1" under "Block Availability" as illustrated. An available logical erase block/available metablock 906 may be designated to receive data from write commands having a sequential workload type in full-block mode when the available logical erase block/available metablock 906 comprises physical erase blocks that each comprise two sister sub-blocks 910. Available logical erase block/available metablock 906 MB8 may be designated for use in full-block mode, as the corresponding potential sister sub-blocks in MB9 are marked as available. Once a full storage block 908 is designated, it may be referred by its first designator, such as MB0 and MB6 for the full storage blocks 908 shown. The second designator (e.g., MB1 and MB7) may not be used, as their sub-blocks may not be accessed separately from their sisters in full-block mode.

In the illustrated example, available logical erase block/available metablock 906 MB2 and MB5 may not be used in full-block mode for sequential workload type write commands, because their sister sub-blocks (MB3 and MB4, respectively) are unavailable logical erase blocks/metablocks.

In one embodiment, a sequential workload type may be determined, but the free metablock pool may not comprise a pair of sub-blocks sharing a common physical erase block on the corresponding memory dies. In such a case, a free metablock such as MB2 may be selected as the target storage block. Configuring this target storage block may then comprise retaining settings for the two or more memory die of the target storage block as sub-block mode configuration settings. The target storage block may be erased in sub-block mode and registered for use in sub-block mode. Settings for a target storage block may not revert automatically to a default once they have been changed. Rather, these settings may stay set for a particular workload type until a different workload type is detected.

Figure 10:
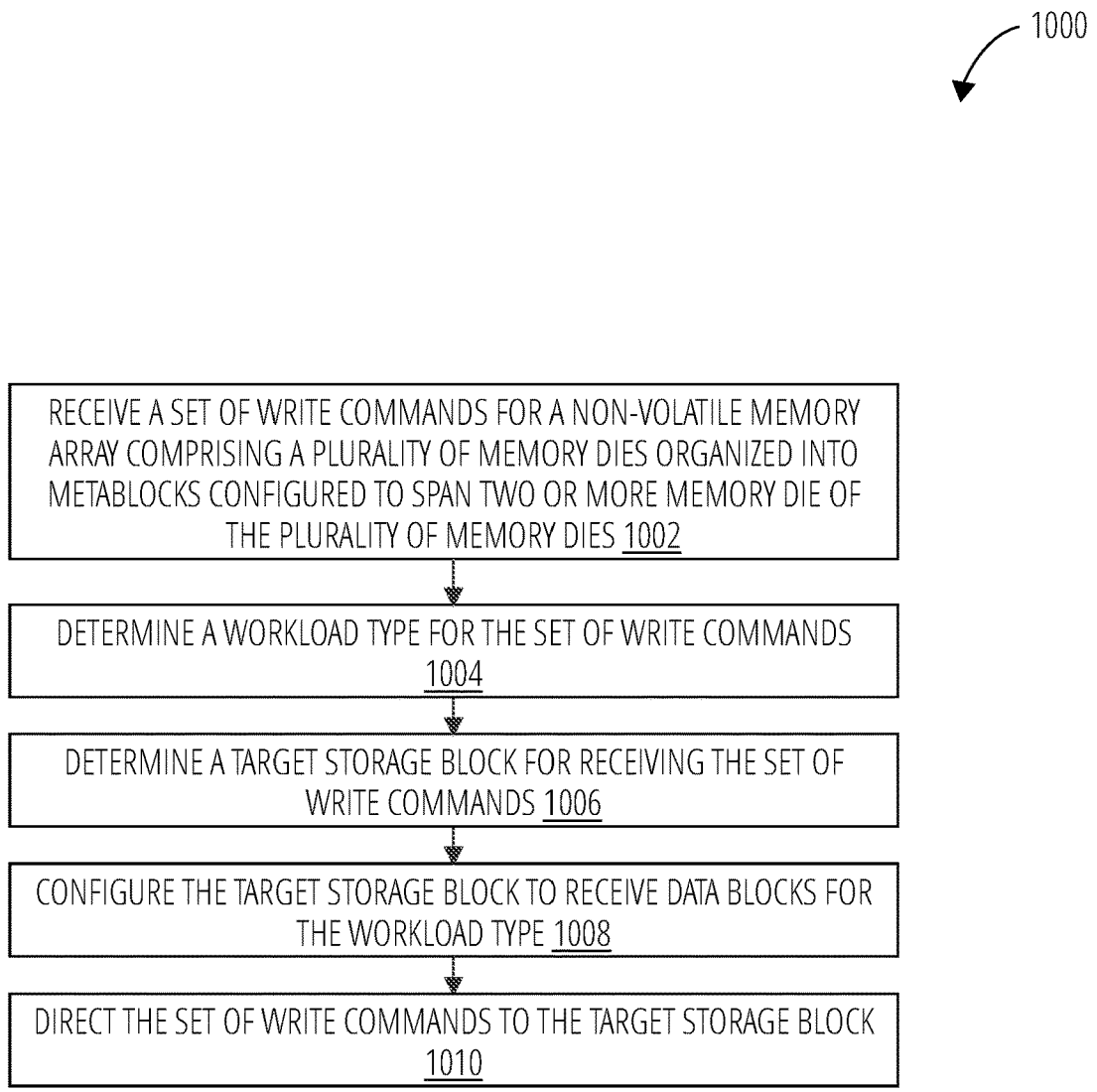
FIG. 10 illustrates a routine 1000 in accordance with one embodiment.

FIG. 10 illustrates a routine 1000 for dynamic allocation for sub-blocks. The system and apparatus disclosed herein may be configured to implement the disclosed method through this routine 1000.

In block 1002, a storage controller may receive a set of write commands for a non-volatile memory array comprising a plurality of memory dies. The memory dies may be organized into metablocks, which are configured to span two or more memory dies of the plurality of memory dies.

In block 1004, the storage controller may determine a workload type for the set of write commands. If a set of write commands each reference a logical block addresses that progress in a sequential order, the storage controller may determine that the set of write commands is of a sequential workload type. If the logical block addresses referenced do not arrive in a sequential order, the set may be determined to be of random workload type.

In block 1006, the storage controller may select a target storage block to receive the set of write commands based on the workload type. In an embodiment where storage blocks are configured by default to operate in sub-block mode, and as long as commands of random workload type are received, target storage blocks may be assigned to any of a set of available logical erase blocks or free metablocks. When commands of sequential workload type are received, the storage controller may attempt to locate available logical erase blocks suitable for use in full-block mode and assign these as the target storage block where possible.

Once the target storage block is determined in block 1006, the target storage block may be configured in block 1008 to receive data blocks for the workload type detected in block 1004. The target storage block may be configured to operate in full-block mode to receive data blocks of sequential workload type. The target storage block may remain in or be reconfigured for operation in sub-block mode to receive data blocks of random workload type.

In block 1010, once the target storage block is configured, the storage controller may direct the set of write commands to the target storage block. The target storage block may be configured such that future write commands associated with the set of write commands are stored in the target storage block until a change in workload type is detected, the target storage block becomes full, or some other event triggers a need to designate a different target storage block.

Figure 11:
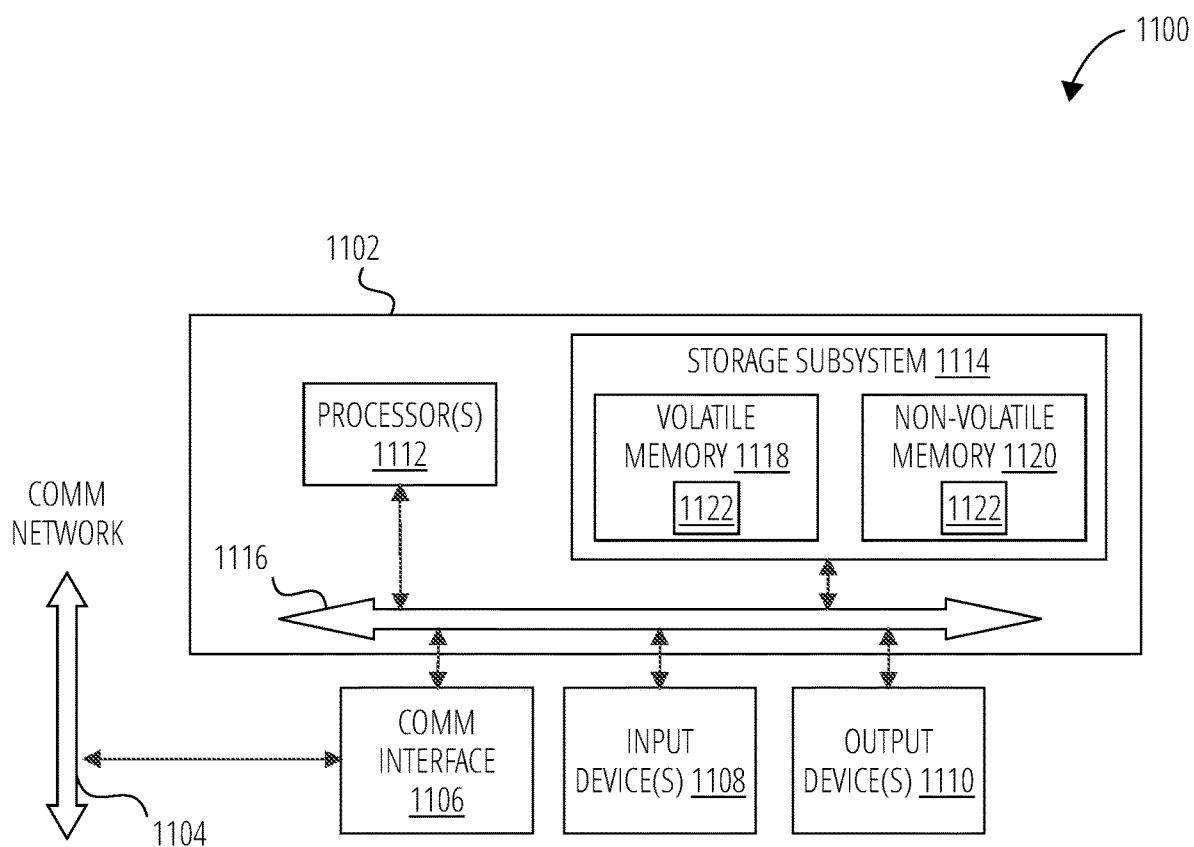
FIG. 11 is an example block diagram of a computing device 1100 that may incorporate certain embodiments.

FIG. 11 is an example block diagram of a computing device 1100 that may incorporate embodiments of the solution. FIG. 11 is merely illustrative of a machine system to carry out aspects of the technical processes described herein and does not limit the scope of the claims. One of ordinary skill in the art would recognize other variations, modifications, and alternatives. In certain embodiments, the computing device 1100 includes a data processing system 1102, a communication network 1104, communication network interface 1106, input device(s) 1108, output device(s) 1110, and the like.

As depicted in FIG. 11, the data processing system 1102 may include one or more processor(s) 1112 and a storage subsystem 1114. The processor(s) 1112 communicate with a number of peripheral devices via a bus subsystem 1116. These peripheral devices may include input device(s) 1108, output device(s) 1110, communication network interface 1106, and the storage subsystem 1114. The storage subsystem 1114, in one embodiment, comprises one or more storage devices and/or one or more memory devices.

In one embodiment, the storage subsystem 1114 includes a volatile memory 1118 and a non-volatile memory 1120. The volatile memory 1118 and/or the non-volatile memory 1120 may store computer-executable instructions that alone or together form logic 1122 that when applied to, and executed by, the processor(s) 1112 implement embodiments of the processes disclosed herein.

The input device(s) 1108 include devices and mechanisms for inputting information to the data processing system 1102. These may include a keyboard, a keypad, a touch screen incorporated into a graphical user interface, audio input devices such as voice recognition systems, microphones, and other types of input devices. In various embodiments, the input device(s) 1108 may be embodied as a computer mouse, a trackball, a track pad, a joystick, wireless remote, drawing tablet, voice command system, eye tracking system, and the like. The input device(s) 1108 typically allow a user to select objects, icons, control areas, text and the like that appear on a graphical user interface via a command such as a click of a button or the like.

The output device(s) 1110 include devices and mechanisms for outputting information from the data processing system 1102. These may include a graphical user interface, speakers, printers, infrared LEDs, and so on, as well understood in the art. In certain embodiments, a graphical user interface is coupled to the bus subsystem 1116 directly by way of a wired connection. In other embodiments, the graphical user interface couples to the data processing system 1102 by way of the communication network interface 1106. For example, the graphical user interface may comprise a command line interface on a separate computing device 1100 such as desktop, server, or mobile device.

The communication network interface 1106 provides an interface to communication networks (e.g., communication network 1104) and devices external to the data processing system 1102. The communication network interface 1106 may serve as an interface for receiving data from and transmitting data to other systems. Embodiments of the communication network interface 1106 may include an Ethernet interface, a modem (telephone, satellite, cable, ISDN), (asynchronous) digital subscriber line (DSL), Fire-Wire, USB, a wireless communication interface such as Bluetooth or WiFi, a near field communication wireless interface, a cellular interface, and the like.

The communication network interface 1106 may be coupled to the communication network 1104 via an antenna, a cable, or the like. In some embodiments, the communication network interface 1106 may be physically integrated on a circuit board of the data processing system 1102, or in some cases may be implemented in software or firmware, such as "soft modems", or the like. "Firmware" refers to logic embodied as processor-executable instructions stored on volatile memory media and/or non-volatile memory media.

The computing device 1100 may include logic that enables communications over a network using protocols such as HTTP, TCP/IP, RTP/RTSP, IPX, UDP and the like.

The volatile memory 1118 and the non-volatile memory 1120 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMs, DVDs, semiconductor memories such as flash memories, non-transitory read-only-memories (ROMS), battery-backed volatile memories, networked storage devices, and the like. The volatile memory 1118 and the non-volatile memory 1120 may be configured to store the basic programming and data constructs that provide the functionality of the disclosed processes and other embodiments thereof that fall within the scope of the present invention.

Logic 1122 that implements one or more parts of embodiments of the solution may be stored in the volatile memory 1118 and/or the non-volatile memory 1120. Logic 1122 may be read from the volatile memory 1118 and/or non-volatile memory 1120 and executed by the processor(s) 1112. The volatile memory 1118 and the non-volatile memory 1120 may also provide a repository for storing data used by the logic 1122.

The volatile memory 1118 and the non-volatile memory 1120 may include a number of memories including a main random-access memory (RAM) for storage of instructions and data during program execution and a read only memory (ROM) in which read-only non-transitory instructions are stored. The volatile memory 1118 and the non-volatile memory 1120 may include a file storage subsystem providing persistent (non-volatile) storage for program and data files. The volatile memory 1118 and the non-volatile memory 1120 may include removable storage systems, such as removable flash memory.

The bus subsystem 1116 provides a mechanism for enabling the various components and subsystems of data processing system 1102 communicate with each other as intended. Although the communication network interface 1106 is depicted schematically as a single bus, some embodiments of the bus subsystem 1116 may utilize multiple distinct busses.

It will be readily apparent to one of ordinary skill in the art that the computing device 1100 may be a device such as a smartphone, a desktop computer, a laptop computer, a rack-mounted computer system, a computer server, or a tablet computer device. As commonly known in the art, the computing device 1100 may be implemented as a collection of multiple networked computing devices. Further, the computing device 1100 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc., are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method, comprising:
   receiving a set of write commands for a non-volatile memory array comprising a plurality of memory dies organized into metablocks configured to span two or more memory dies of the plurality of memory dies;
   determining a workload type for the set of write commands;
   determining a target storage block for receiving the set of write commands based on the workload type;
   configuring the target storage block to receive data blocks for the workload type, wherein, based on the determining of the workload type, the configuring comprises changing the target storage block from a full-block mode to a sub-block mode or from a sub-block mode to a full-block mode; and
   directing the set of write commands to the target storage block, wherein the target storage block is a physical block comprising two or more sub-blocks, wherein the two or more sub-blocks being physically joined by a joint, and wherein the target storage block is configured to operate in the full-block mode where the sub-blocks operate together and the sub-block mode where the sub-blocks operate independently.

2. The method of claim 1, wherein the workload type comprises a sequential workload type and wherein determining the target storage block further comprises:
   selecting a metablock from a free metablock pool for use as the target storage block; and wherein configuring the target storage block comprises:
      setting configuration settings for the two or more memory dies of the target storage block to full-block mode configuration settings;
      erasing the target storage block in the full-block mode; and
      registering the target storage block as a full storage block.

3. The method of claim 2, wherein setting the configuration settings comprises changing configuration settings for the two or more memory dies of the target storage block from sub-block mode configuration settings to the full-block mode configuration settings.

4. The method of claim 2, wherein registering the target storage block comprises:
   updating a metablock tracking table to identify the target storage block as a full storage block; and
   managing the target storage block as a full storage block until the target storage block is erased subsequent to receiving data for the set of write commands.

5. The method of claim 1, wherein the workload type comprises a sequential workload type and wherein determining the target storage block further comprises:
   determining that a free metablock pool of the metablocks comprises no free metablocks comprising a pair of sub-blocks that share a common physical erase block in each of the two or more memory dies;
   selecting a metablock from the free metablock pool as the target storage block; and wherein configuring the target storage block comprises:
      retaining configuration settings for the two or more memory dies of the target storage block as sub-block mode configuration settings;
      erasing the target storage block in the sub-block mode; and
      registering the target storage block for use in the sub-block mode.

6. The method of claim 1, wherein the workload type comprises a random workload type and wherein configuring the target storage block comprises:
   changing configuration settings for the two or more memory dies of the target storage block from full-block mode configuration settings to sub-block mode configuration settings.

7. The method of claim 1, wherein determining the target storage block further comprises selecting an open metablock from a set of open metablocks and designating the selected open metablock as the target storage block, wherein the workload type comprises a sequential workload type and the selected open metablock is configured to operate in the full-block mode.

8. The method of claim 1, wherein determining the target storage block further comprises selecting an open metablock from a set of open metablocks and designating the selected open metablock as the target storage block, wherein the workload type comprises a random workload type and the selected open metablock is configured to operate in the sub-block mode.

9. The method of claim 1, associating the target storage block with the set of write commands such that future write commands associated with the set of write commands are stored in the target storage block.

10. The method of claim 1, wherein determining the workload type for the set of write commands comprises:
monitoring a plurality of write commands that includes the set of write commands, the plurality of write command received in sequence;
comparing logical block addresses of the plurality of write commands to logical block addresses for the set of write commands; and
determining that the workload type is a sequential workload type based on the compared logical block addresses for the set of write commands being in sequential order relative to the logical block addresses of the plurality of write commands.

11. An apparatus, comprising:
a stream manager circuit configured to monitor write commands and to determine that a set of write commands of the monitored write commands correlate to a sequential workload type;
a free metablock, wherein the free metablock is a physical block comprising a pair of physical sister sub-blocks, wherein the free metablock is configured to operate in a full-block mode where the pair of physical sister sub-blocks operate together and a sub-block mode where the pair of physical sister sub-blocks operate independently;
a metablock management circuit configured to designate the free metablock to receive data for the set of write commands and configured to erase the free metablock in the full-block mode;
a block allocation manager configured to, based on the determining, change the free metablock from the full-block mode to the sub-block mode or from the sub-block mode to the full-block mode;
a mode circuit configured to send a full-block mode command to a plurality of memory dies that include a portion of the free metablock, the memory dies coupled in parallel to an interface bus;
a tracking circuit configured to associate the free metablock with the pair of physical sister sub-blocks on each memory die of the plurality of memory dies; and
a read/write circuit configured to write data to the free metablock in the full-block mode in response to the set of write commands correlating to the sequential workload type.

12. The apparatus of claim 11, wherein the plurality of memory dies are configured to store sub-block mode configuration settings and full-block mode configuration settings in volatile memory of a die controller and the full-block mode command is configured to cause a die controller of each memory die of the plurality of memory dies to exchange the sub-block mode configuration settings for the full-block mode configuration settings.

13. The apparatus of claim 11, wherein the stream manager circuit is further configured to: determine a second set of write commands of the monitored write commands that correlate to a random workload type;
wherein the metablock management circuit is configured to designate a second free metablock to receive data for the second set of write commands and is configured to erase the second free metablock in the sub-block mode, the plurality of memory dies comprising the second free metablock and the free metablock;
wherein the mode circuit is configured to send a sub-block mode command to the plurality of memory dies, the sub-block mode command configured to change configuration settings of the plurality of memory dies from full-block mode configuration settings to sub-block mode configuration settings;
wherein the tracking circuit is configured to associate the second free metablock with one of a pair of sister sub-blocks on each of the plurality of memory dies configured to include a portion of the second free metablock; and
wherein the read/write circuit is configured to write data to the second free metablock in the sub-block mode in response to the second set of write commands correlating to the random workload type.

14. The apparatus of claim 11, wherein the mode circuit is configured to issue one of a full-block mode command and a sub-block mode command exclusively in response to a change in a workload type for subsequent sets of write commands of the monitored write commands.

15. The apparatus of claim 11, wherein the full-block mode command is configured to change configuration settings of the plurality of memory dies from sub-block mode configuration settings to full-block mode configuration settings.

16. A system, comprising:
a non-volatile memory array comprising a plurality of memory dies organized into at least one row and two or more columns;
a set of logical erase blocks comprising a physical erase block from each memory die of a row of the non-volatile memory array, each physical erase block that forms a logical erase block comprising two physical sister sub-blocks, the two physical sister sub-blocks being physically joined by a joint, wherein a target storage block is configured to operate in a full-block mode where the two physical sister sub-blocks operate together and a sub-block mode where the two physical sister sub-blocks operate independently;
a write data pipeline configured to receive write commands and write data of the write commands into one of the set of logical erase blocks in the sub-block mode, each of the write commands comprising a logical block address;
a stream manager configured to:
monitor the write commands to determine a workload type, the write commands received in sequence;
compare logical block addresses of the write commands to logical block addresses of prior write commands; and
determine that the workload type is a sequential workload type based on the compared logical block addresses;
a block allocation manager configured to:
reconfigure a logical erase block of the set of logical erase blocks for storage operations in the full-block mode, wherein, based on the determining, the reconfiguring comprises changing the logical erase block from the sub-block mode to the full-block mode or from the full-block mode to the sub-block mode;
direct write commands having a sequential workload type to the reconfigured logical erase block; and direct the write data pipeline to write data to the reconfigured logical erase block in the full-block mode; and an open block manager configured to manage the reconfigured logical erase block in the full-block mode.

17. The system of claim 16, wherein the block allocation manager is configured to reference a metablock tracking table to determine an available logical erase block of the set of logical erase blocks to designate the available logical erase block for write commands having a sequential workload type in response to the available logical erase block comprising physical erase block that each comprise two sister sub-blocks.

18. The system of claim 16, wherein each logical erase block configured to store data in the sub-block mode comprises a first sister sub-block and second sister sub-block, the system further comprising a garbage collector configured to consolidate valid data from the first sister sub-block and retain data of the second sister sub-block during a garbage collection operation.

19. The system of claim 16, wherein the block allocation manager is configured to reconfigure the logical erase block by sending a full-block mode command to the plurality of memory dies that include the logical erase block.

20. The system of claim 16, wherein the block allocation manager is configured to direct write commands having a sequential workload type to the reconfigured logical erase block and direct the write data pipeline to write data to the logical erase block in the full-block mode until write commands having a random workload type are determined by the stream manager.

\* \* \* \* \*